(12) United States Patent
Robichaux et al.

(10) Patent No.: US 8,146,663 B2
(45) Date of Patent: *Apr. 3, 2012

(54) SEAL CONFIGURATION FOR TOP DRIVE SWIVEL APPARATUS AND METHOD

(75) Inventors: Kip M. Robichaux, Houma, LA (US); Terry P. Robichaux, Houma, LA (US); Kenneth G. Caillouet, Thibodaux, LA (US)

(73) Assignee: Mako Rentals, Inc., Houma, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/074,327

(22) Filed: Mar. 29, 2011

(65) Prior Publication Data

US 2011/0226465 A1 Sep. 22, 2011

Related U.S. Application Data

(63) Continuation of application No. 12/724,846, filed on Mar. 16, 2010, now Pat. No. 7,913,760, which is a continuation of application No. 11/778,956, filed on Jul. 17, 2007, now Pat. No. 7,681,646, which is a continuation-in-part of application No. 11/751,740, filed on May 22, 2007, now Pat. No. 7,533,720.

(60) Provisional application No. 60/829,990, filed on Oct. 18, 2006, provisional application No. 60/803,055, filed on May 24, 2006.

(51) Int. Cl.
*E21B 33/16* (2006.01)
*E21B 19/00* (2006.01)

(52) U.S. Cl. ................... 166/291; 166/84.1; 166/177.4

(58) Field of Classification Search .............. 166/291, 166/292, 155, 177.4, 84.1
See application file for complete search history.

(56) References Cited

U.S. PATENT DOCUMENTS

| | | | |
|---|---|---|---|
| 1,704,053 | A | 3/1925 | Miller |
| 2,113,647 | A | 4/1938 | Davidson et al. |
| RE21,677 | E | 12/1940 | Tremolada |
| 2,713,909 | A | 7/1955 | Baker |
| 2,961,045 | A | 11/1960 | Stogner et al. |
| 2,961,046 | A | 11/1960 | Moeller et al. |
| 3,403,729 | A | 10/1968 | Hickey |
| 3,616,850 | A | 11/1971 | Scott |
| 3,720,264 | A | 3/1973 | Hutchison |
| 3,750,749 | A | 8/1973 | Giroux |
| 3,850,241 | A | 11/1974 | Hutchinson |
| 4,219,087 | A | 8/1980 | Johnson |
| 4,317,486 | A | 3/1982 | Harris |

(Continued)

*Primary Examiner* — William P Neuder
(74) *Attorney, Agent, or Firm* — Garvey, Smith, Nehrbass & North, L.L.C.; Brett A. North

(57) ABSTRACT

For use with a top drive power unit supported for connection with a well string in a well bore to selectively impart longitudinal and/or rotational movement to the well string, a feeder for supplying a pumpable substance such as cement and the like from an external supply source to the interior of the well string in the well bore without first discharging it through the top drive power unit including a mandrel extending through a sleeve which is sealably and rotatably supported thereon for relative rotation between the sleeve and mandrel. The mandrel and sleeve have flow passages for communicating the pumpable substance from an external source to discharge through the sleeve and mandrel and into the interior of the well string below the top drive power unit. The unit can include a packing injection system and novel seal configuration.

17 Claims, 27 Drawing Sheets

U.S. PATENT DOCUMENTS

| | | | |
|---|---|---|---|
| 4,418,947 A | 12/1983 | Talafuse | |
| 4,427,065 A | 1/1984 | Watson | |
| 4,624,312 A | 11/1986 | McMullin | |
| 4,671,353 A | 6/1987 | Daming | |
| 4,722,389 A | 2/1988 | Arnold | |
| 4,854,383 A | 8/1989 | Arnold et al. | |
| RE33,150 E | 1/1990 | Boyd | |
| 4,907,649 A | 3/1990 | Bode | |
| 4,917,184 A | 4/1990 | Freeman et al. | |
| 4,995,457 A | 2/1991 | Baldridge | |
| 5,095,988 A | 3/1992 | Bode | |
| 5,205,359 A | 4/1993 | Stephenson | |
| 5,236,035 A | 8/1993 | Brisco et al. | |
| 5,277,248 A | 1/1994 | Breland | |
| 5,293,933 A | 3/1994 | Brisco | |
| 5,435,390 A | 7/1995 | Baugh et al. | |
| 5,443,122 A | 8/1995 | Brisco | |
| 5,494,107 A | 2/1996 | Bode | |
| 5,722,491 A | 3/1998 | Sullaway et al. | |
| 5,829,523 A | 11/1998 | North | |
| 5,833,002 A | 11/1998 | Holcombe | |
| 5,890,537 A | 4/1999 | Lavaure et al. | |
| 5,950,724 A | 9/1999 | Giebeler | |
| 6,206,095 B1 | 3/2001 | Baugh | |
| 6,575,238 B1 | 6/2003 | Yokley | |
| 7,007,753 B2 | 3/2006 | Robichaux et al. | |
| 7,533,720 B2 * | 5/2009 | Robichaux et al. | 166/84.1 |
| 7,681,646 B2 * | 3/2010 | Robichaux et al. | 166/291 |
| 7,798,209 B1 * | 9/2010 | Robichaux et al. | 166/84.1 |
| 7,913,760 B2 * | 3/2011 | Robichaux et al. | 166/291 |
| 2004/0035574 A1 | 2/2004 | Rippert | |
| 2005/0039925 A1 | 2/2005 | Connell | |

\* cited by examiner

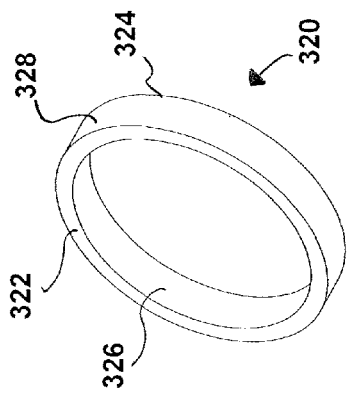
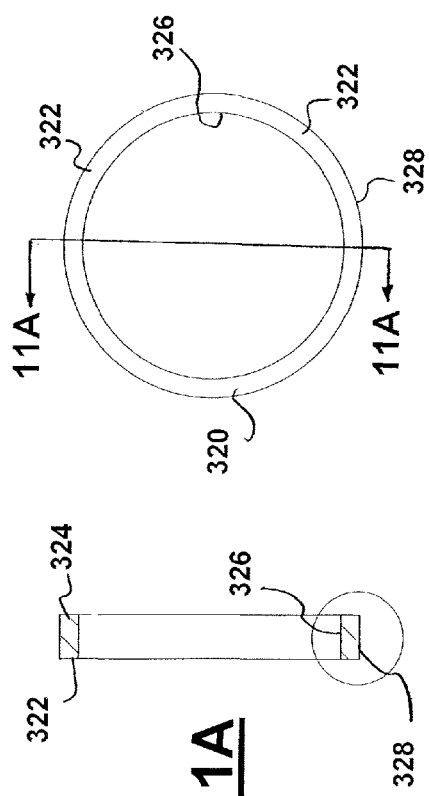
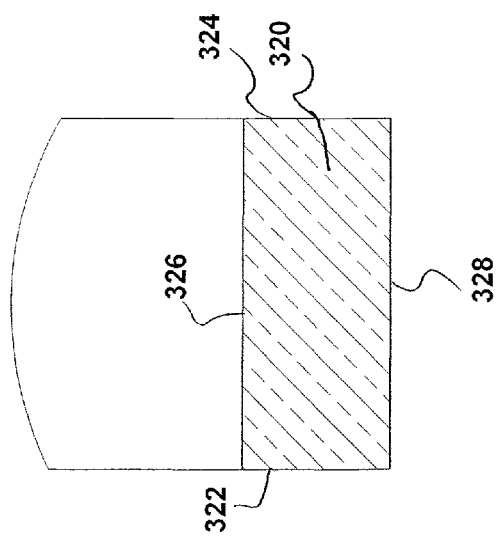

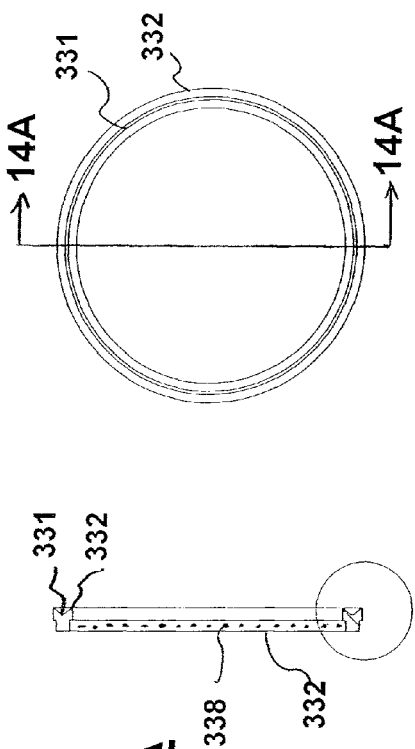
FIG. 13
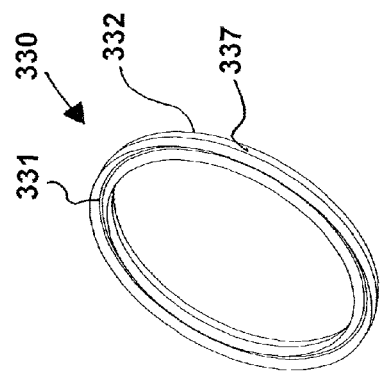
FIG. 12
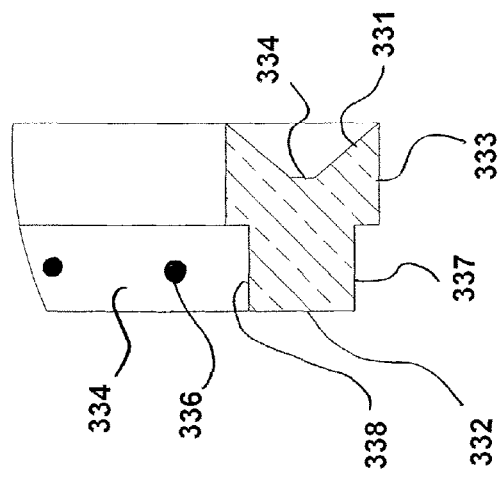
FIG. 14A
FIG. 14B

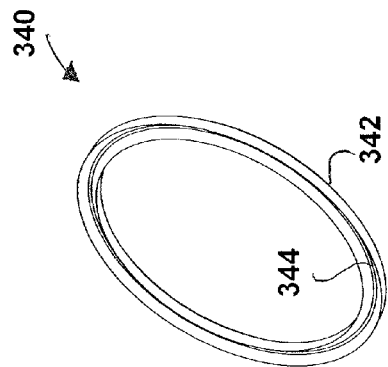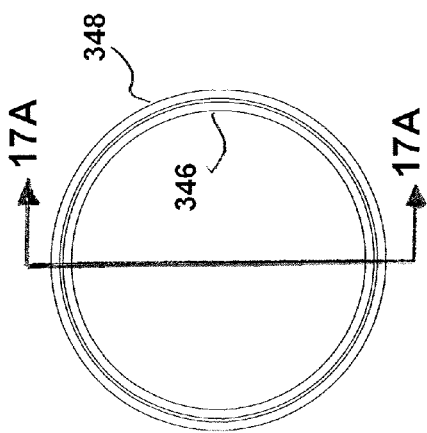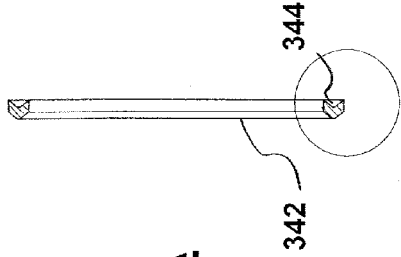

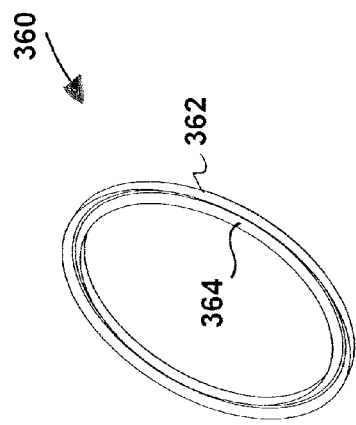
FIG. 22
FIG. 21
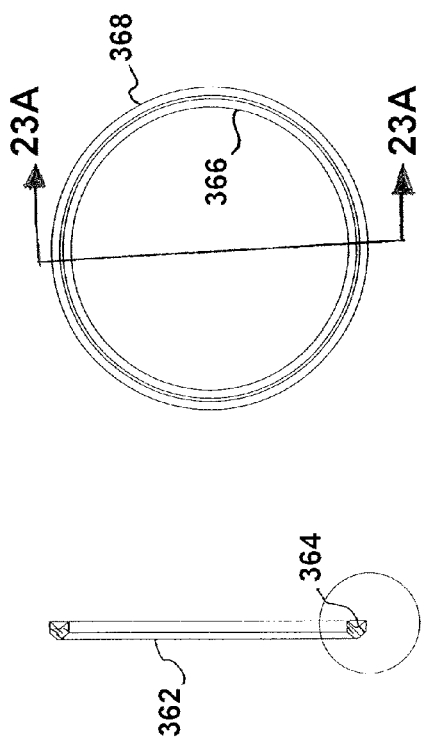
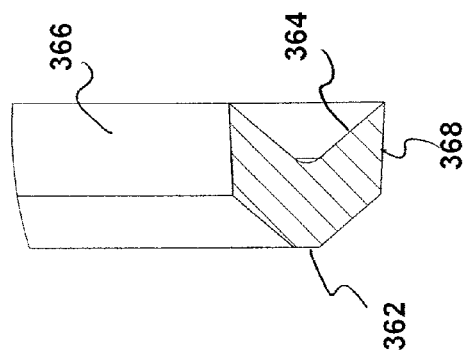
FIG. 23B
FIG 23A

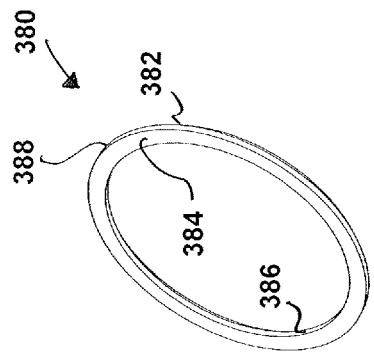
FIG. 28
FIG. 27
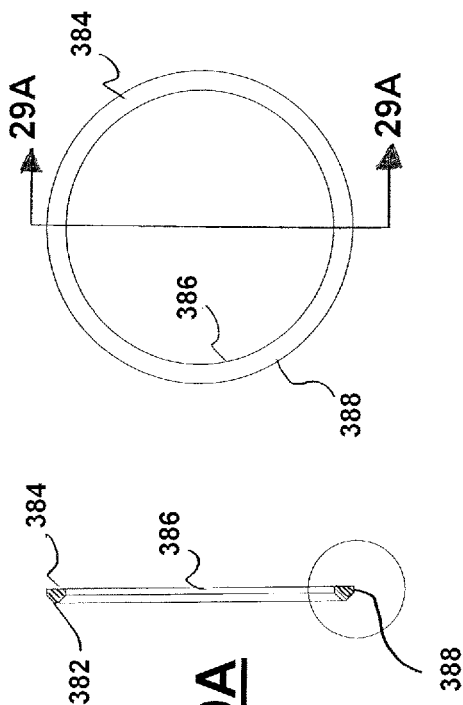
FIG. 29A
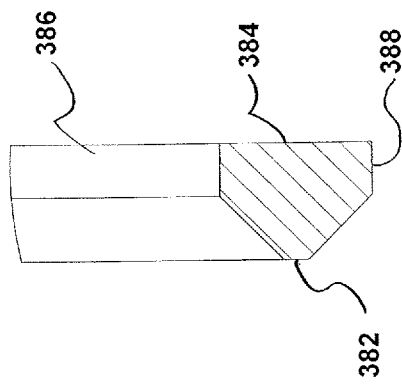
FIG. 29B

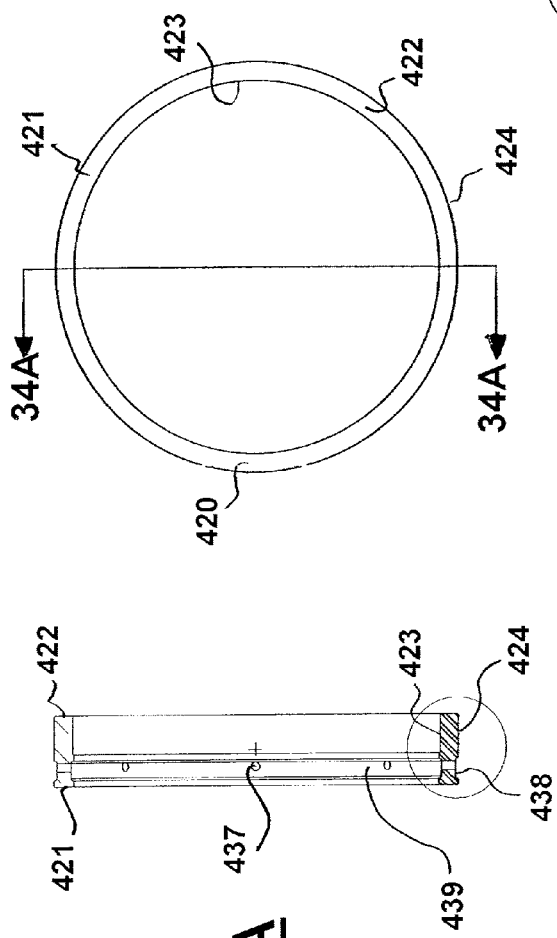
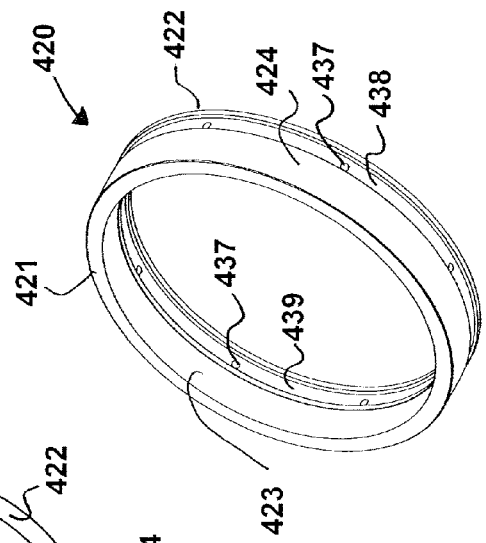
FIG. 33
FIG. 32
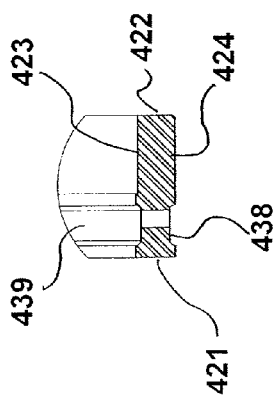
FIG. 34B
FIG. 34A

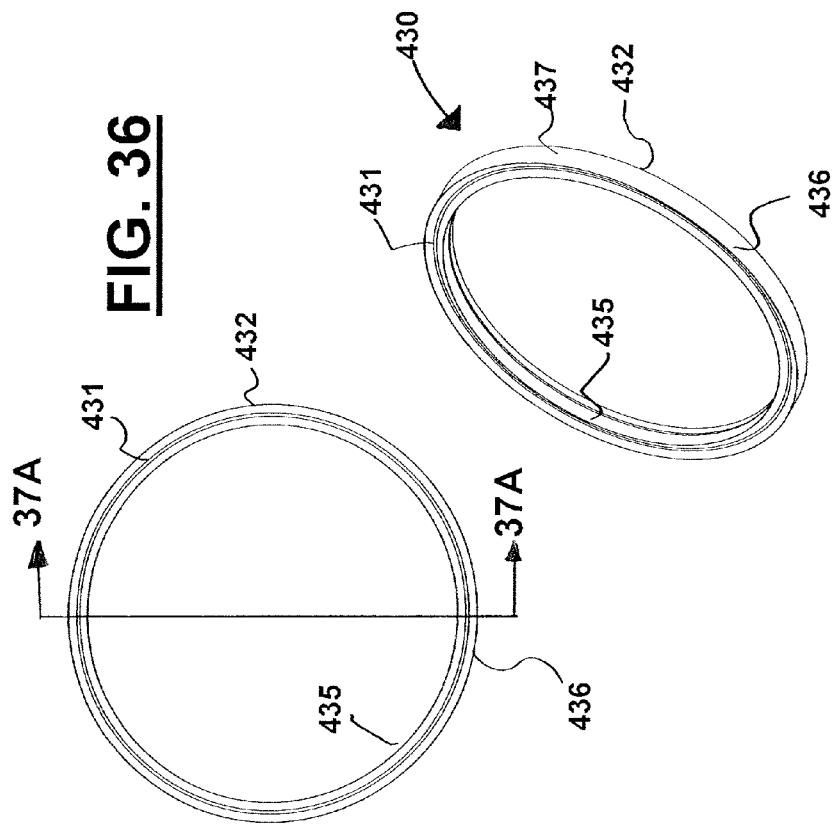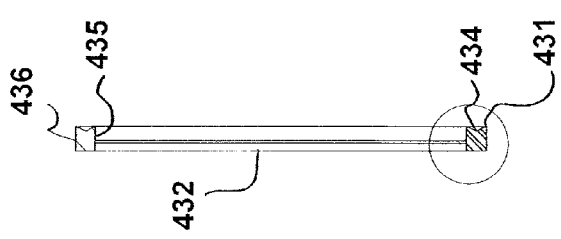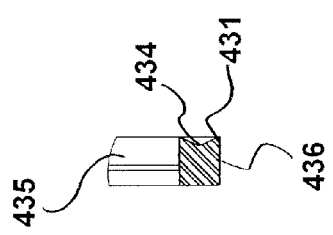

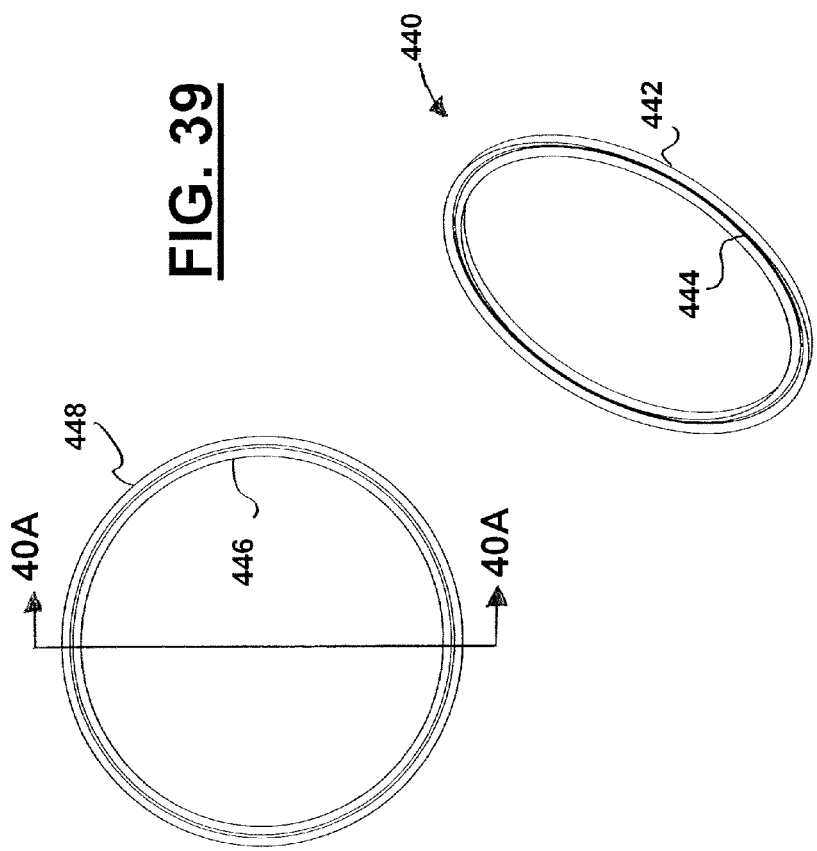
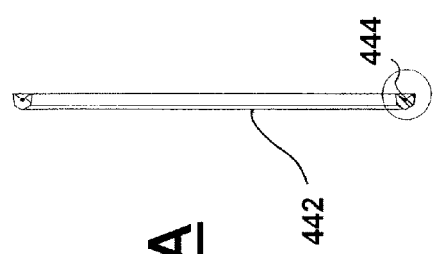
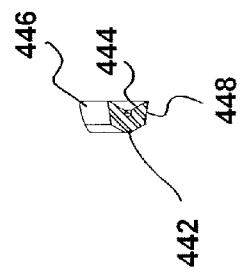

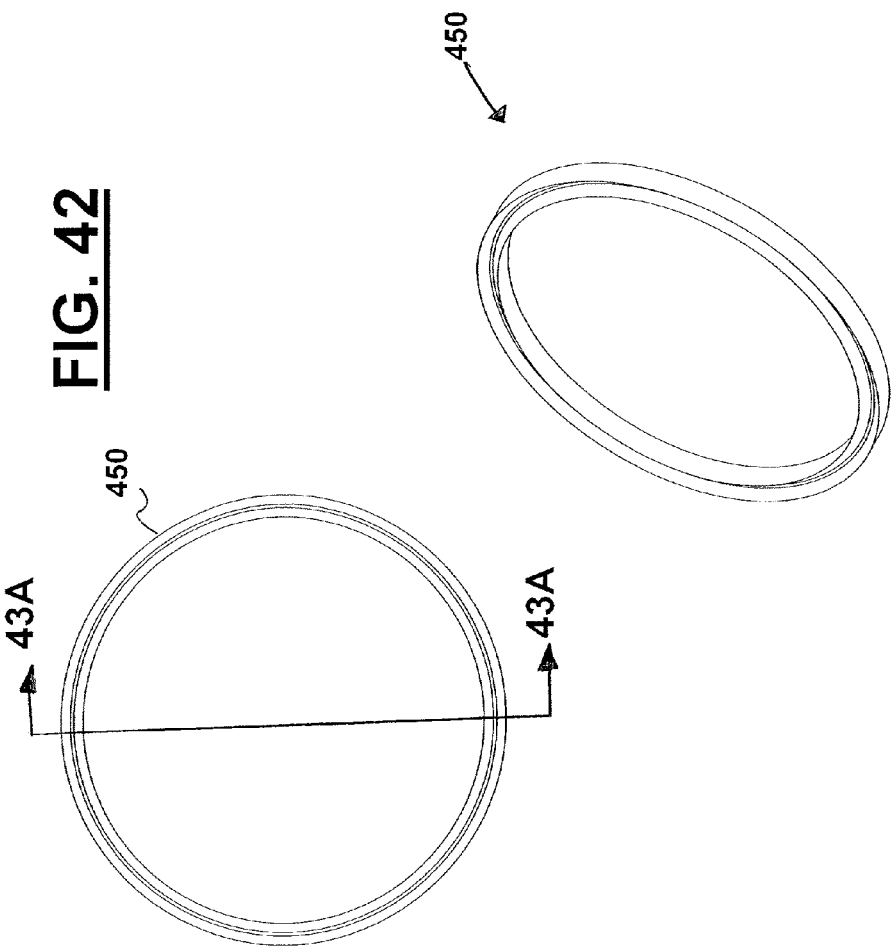
FIG. 42
FIG. 41
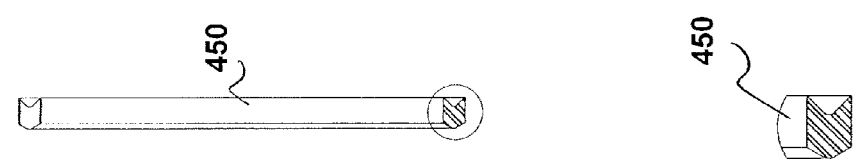
FIG. 43A
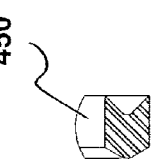
FIG. 43B

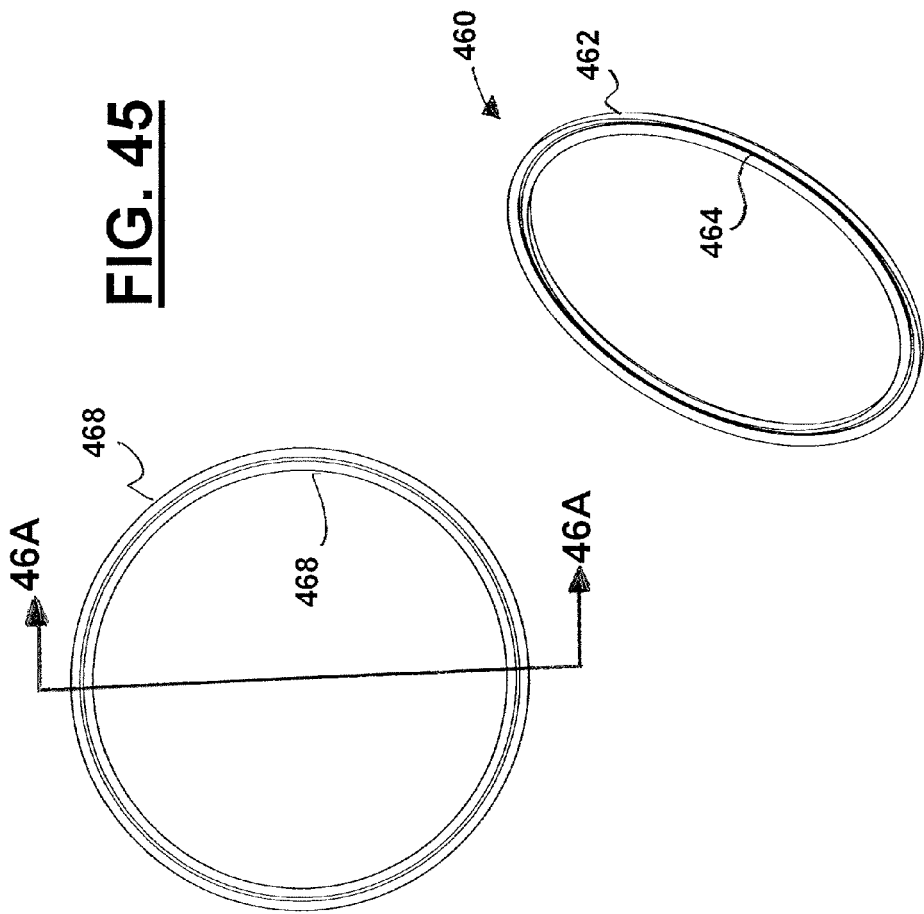
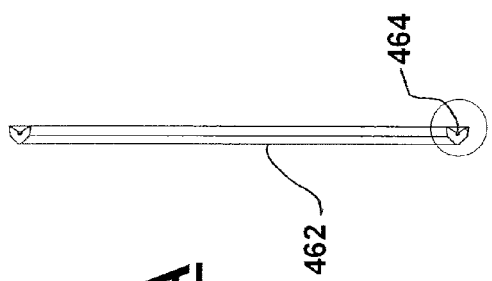
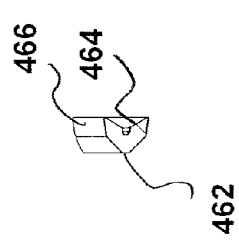

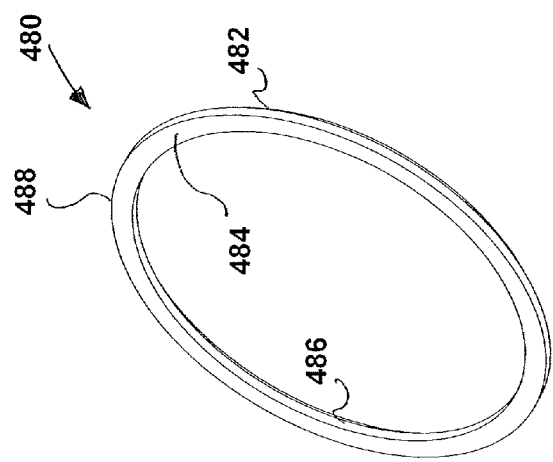
FIG. 51
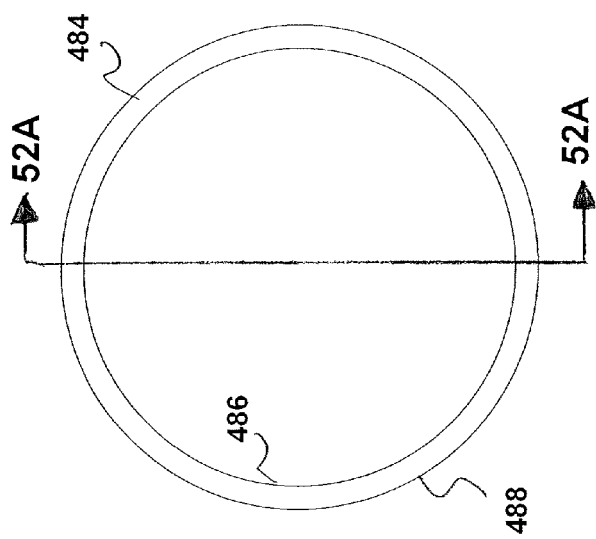
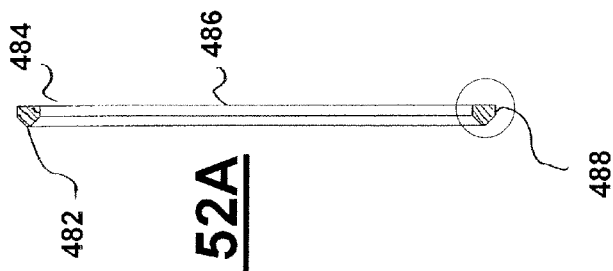
FIG. 52A
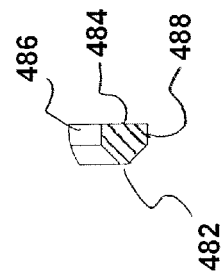
FIG. 50
FIG. 52B

US 8,146,663 B2

SEAL CONFIGURATION FOR TOP DRIVE SWIVEL APPARATUS AND METHOD

CROSS-REFERENCE TO RELATED APPLICATIONS

This is a continuation of U.S. patent application Ser. No. 12/724,846, filed Mar. 16, 2010, (issuing as U.S. Pat. No. 7,913,760 on Mar. 29, 2011), which application was a continuation of U.S. patent application Ser. No. 11/778,956, filed Jul. 17, 2007 (issued as U.S. Pat. No. 7,681,646 on Mar. 23, 2010) which was a continuation-in-part of U.S. patent application Ser. No. 11/751,740, filed May 22, 2007 (issued as U.S. Pat. No. 7,533,720 on May 19, 2009) which was a non-provisional of U.S. Provisional Patent Application Ser. No. 60/829,990, filed Oct. 18, 2006 and U.S. Provisional Patent Application Ser. No. 60/803,055, filed May 24, 2006.

Each of these applications are incorporated herein by reference. Priority of each of these applications is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND

In top drive rigs, the use of a top drive unit, or top drive power unit is employed to rotate drill pipe, or well string in a well bore. Top drive rigs can include spaced guide rails and a drive frame movable along the guide rails and guiding the top drive power unit. The traveling block supports the drive frame through a hook and swivel, and the driving block is used to lower or raise the drive frame along the guide rails. For rotating the drill or well string, the top drive power unit includes a motor connected by gear means with a rotatable member both of which are supported by the drive frame.

During drilling operations, when it is desired to "trip" the drill pipe or well string into or out of the well bore, the drive frame can be lowered or raised. Additionally, during servicing operations, the drill string can be moved longitudinally into or out of the well bore.

The stem of the swivel communicates with the upper end of the rotatable member of the power unit in a manner well known to those skilled in the art for supplying fluid, such as a drilling fluid or mud, through the top drive unit and into the drill or work string. The swivel allows drilling fluid to pass through and be supplied to the drill or well string connected to the lower end of the rotatable member of the top drive power unit as the drill string is rotated and/or moved up and down.

Top drive rigs also can include elevators are secured to and suspended from the frame, the elevators being employed when it is desired to lower joints of drill string into the well bore, or remove such joints from the well bore.

At various times top drive operations, beyond drilling fluid, require various substances to be pumped downhole, such as cement, chemicals, epoxy resins, or the like. In many cases it is desirable to supply such substances at the same time as the top drive unit is rotating and/or moving the drill or well string up and/or down, but bypassing the top drive's power unit so that the substances do not damage/impair the unit. Additionally, it is desirable to supply such substances without interfering with and/or intermittently stopping longitudinal and/or rotational movement by the top drive unit of the drill or well string.

A need exists for a device facilitating insertion of various substances downhole through the drill or well string, bypassing the top drive unit, while at the same time allowing the top drive unit to rotate and/or move the drill or well string.

One example includes cementing a string of well bore casing. In some casing operations it is considered good practice to rotate the string of casing when it is being cemented in the wellbore. Such rotation is believed to facilitate better cement distribution and spread inside the annular space between the casing's exterior and interior of the well bore. In such operations the top drive unit can be used to both support and continuously rotate/intermittently reciprocate the string of casing while cement is pumped down the string's interior. During this time it is desirable to by-pass the top drive unit to avoid possible damage to any of its portions or components.

The following U.S. patents are incorporated herein by reference: U.S. Pat. Nos. 4,722,389 and 7,007,753.

While certain novel features of this invention shown and described below are pointed out in the annexed claims, the invention is not intended to be limited to the details specified, since a person of ordinary skill in the relevant art will understand that various omissions, modifications, substitutions and changes in the forms and details of the device illustrated and in its operation may be made without departing in any way from the spirit of the present invention. No feature of the invention is critical or essential unless it is expressly stated as being "critical" or "essential."

BRIEF SUMMARY

The apparatus of the present invention solves the problems confronted in the art in a simple and straightforward manner. One embodiment relates to an assembly having a top drive arrangement for rotating and longitudinally moving a drill or well string. In one embodiment is provided a swivel apparatus, the swivel generally comprising a mandrel and a sleeve with a packing configuration, the swivel being especially useful for top drive rigs.

In one embodiment the sleeve can be rotatably and sealably connected to the mandrel. The swivel can be incorporated into a drill or well string, enabling string sections both above and below the sleeve to be rotated in relation to the sleeve. Additionally, the swivel provides a flow path between the exterior of the sleeve and interior of the mandrel while the drill string is being rotated and/or being moved in a longitudinal direction (up or down). The interior of the mandrel can be fluidly connected to the longitudinal bore of the casing or drill string thereby providing a flow path from the exterior of the sleeve to the interior of the casing/drill string.

In one embodiment is provided a method and apparatus for servicing a well wherein a swivel is connected to a top drive unit for conveying pumpable substances from an external supply through the swivel for discharge into the well string and bypassing the top drive unit.

In another embodiment is provided a method of conducting servicing operations in a well bore, such as cementing, comprising the steps of moving a top drive unit rotationally and/or longitudinally to provide longitudinal movement and/or rotation in the well bore of a well string suspended from the top drive unit, rotating the drill or well string and supplying a pumpable substance to the well bore in which the drill or well string is manipulated by introducing the pumpable substance at a point below the top drive power unit and into the well string.

In other embodiments are provided a swivel placed below the top drive unit can be used to perform jobs such as spotting pills, squeeze work, open formation integrity work, kill jobs, fishing tool operations with high pressure pumps, sub-sea stack testing, rotation of casing during side tracking, and gravel pack or frack jobs. In still other embodiments a top drive swivel can be used in a method of pumping loss circulation material (LCM) into a well to plug/seal areas of downhole fluid loss to the formation and in high speed milling jobs using cutting tools to address down hole obstructions. In other embodiments the top drive swivel can be used with free point indicators and shot string or cord to free stuck pipe where pumpable substances are pumped downhole at the same time the downhole string/pipe/free point indicator is being rotated and/or reciprocated. In still other embodiments the top drive swivel can be used for setting hook wall packers and washing sand.

In still other embodiments the top drive swivel can be used for pumping pumpable substances downhole when repairs/servicing is being done to the top drive unit and rotation of the downhole drill string is being accomplished by the rotary table. Such use for rotation and pumping can prevent sticking/seizing of the drill string downhole. In this application safety valves, such as TIW valves, can be placed above and below the top drive swivel to enable routing of fluid flow and to ensure well control.

The drawings constitute a part of this specification and include exemplary embodiments to the invention, which may be embodied in various forms.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 9 is a perspective view of a spacer;

FIG. 10 is a top view of the spacer of FIG. 9;

FIG. 11A is a sectional side view of the spacer of FIG. 9;

FIG. 11B is an enlarged sectional side view of the spacer of FIG. 9;

FIG. 12 is a perspective view of a female backup ring;

FIG. 13 is a top view of the female backup ring of FIG. 12;

FIG. 14A is a sectional side view of the female backup ring of FIG. 12;

FIG. 14B is an enlarged sectional side view of the female backup ring of FIG. 12;

FIG. 15 is a perspective view of a seal ring;

FIG. 16 is a top view of the seal ring of FIG. 15;

FIG. 17A is a sectional side view of the seal ring of FIG. 15;

FIG. 17B is an enlarged sectional side view of the seal ring of FIG. 15;

FIG. 21 is a perspective view of a seal ring;

FIG. 22 is a top view of the seal ring of FIG. 21;

FIG. 23A is a sectional side view of the seal ring of FIG. 21;

FIG. 23B is an enlarged sectional side view of the seal ring of FIG. 21;

FIG. 24 is a perspective view of a seal ring;

FIG. 27 is a perspective view of a male backup ring;

FIG. 28 is a top view of the male backup ring of FIG. 27;

FIG. 29A is a sectional side view of the male backup ring of FIG. 27;

FIG. 29B is an enlarged sectional side view of the male backup ring of FIG. 27;

FIG. 32 is a perspective view of a spacer;

FIG. 33 is a top view of the spacer of FIG. 32;

FIG. 34A is a sectional side view of the spacer of FIG. 32;

FIG. 34B is an enlarged sectional side view of the spacer of FIG. 32;

FIG. 35 is a perspective view of a female backup ring;

FIG. 36 is a top view of the female backup ring of FIG. 35;

FIG. 37A is a sectional side view of the female backup ring of FIG. 35;

FIG. 37B is an enlarged sectional side view of the female backup ring of FIG. 35;

FIG. 38 is a perspective view of a seal ring;

FIG. 39 is a top view of the seal ring of FIG. 38;

FIG. 40A is a sectional side view of the seal ring of FIG. 38;

FIG. 40B is an enlarged sectional side view of the seal ring of FIG. 38;

FIG. 41 is a perspective view of a rope seal;

FIG. 42 is a top view of the rope seal of FIG. 41;

FIG. 43A is a sectional side view of the rope seal of FIG. 41;

FIG. 43B is an enlarged sectional side view of the rope seal of FIG. 41;

FIG. 44 is a perspective view of a seal ring;

FIG. 45 is a top view of the seal ring of FIG. 44;

FIG. 46A is a sectional side view of the seal ring of FIG. 44;

FIG. 46B is an enlarged sectional side view of the seal ring of FIG. 44;

FIG. 50 is a perspective view of a male backup ring;

FIG. 51 is a top view of the male backup ring of FIG. 50;

FIG. 52A is a sectional side view of the male backup ring of FIG. 50;

FIG. 52B is an enlarged sectional side view of the male backup ring of FIG. 50.

DETAILED DESCRIPTION

Detailed descriptions of one or more preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in any appropriate system, structure or manner.

Figure 1A:
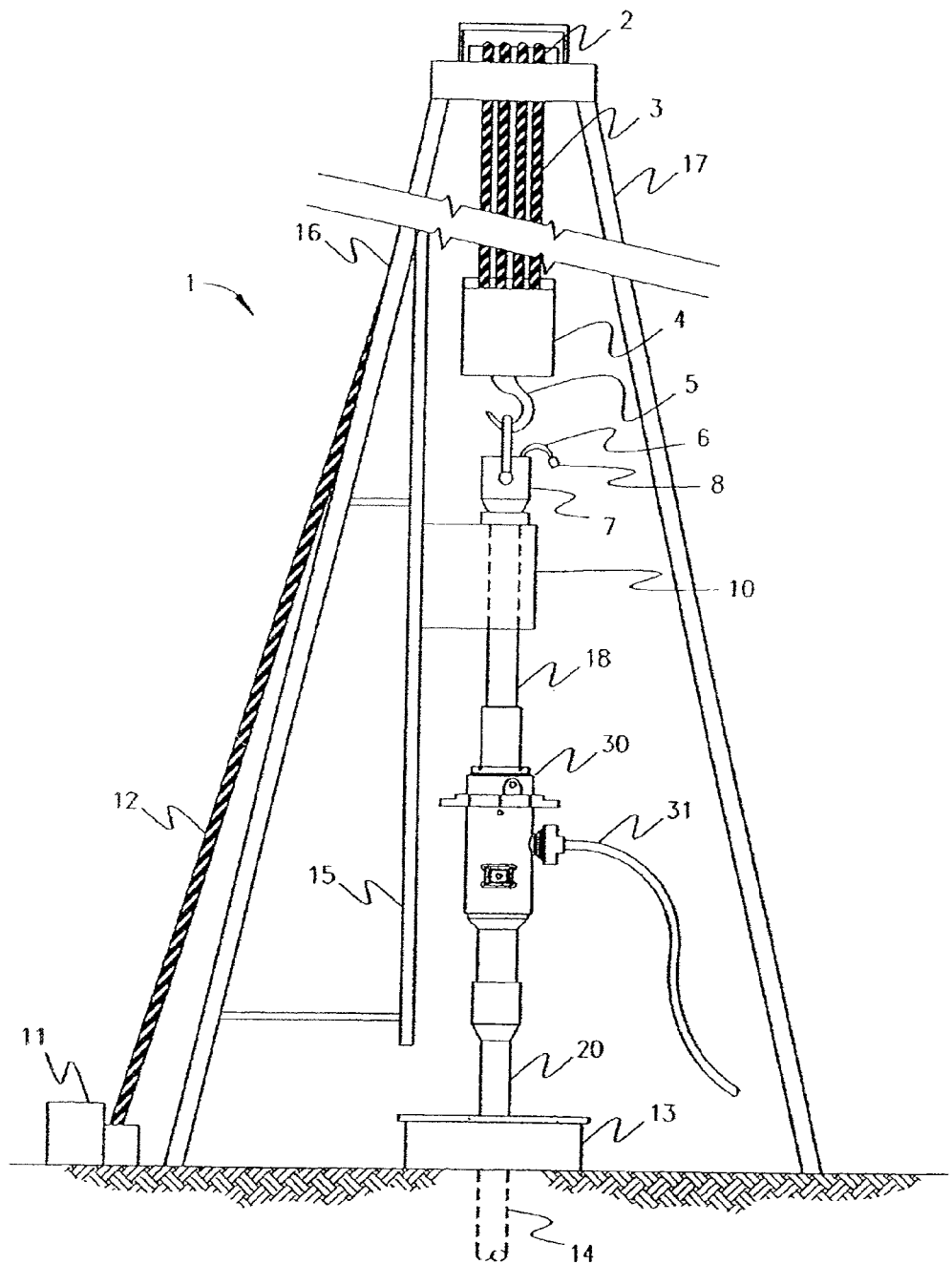
FIGS. 1A and 1B are a schematic views showing a top drive rig with one embodiment of a top drive swivel incorporated in the drill string.
Figure 1B:
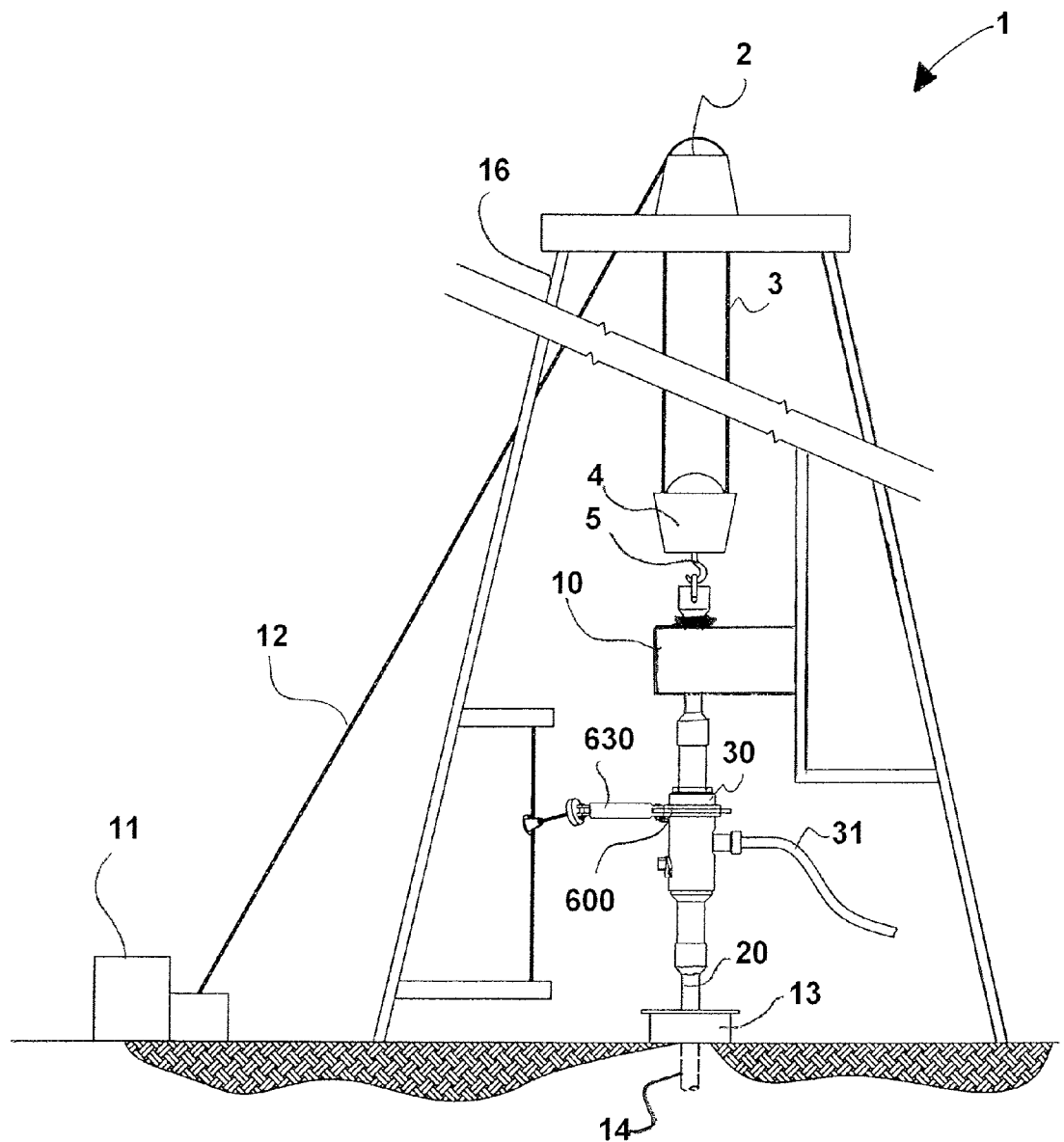

FIGS. 1A and 1B are schematic views showing a top drive rig 1 with one embodiment of a top drive swivel 30 incorporated into drill string 20. FIG. 1A shows a rig 1 having a top drive unit 10. Rig 1 comprises supports 16,17; crown block 2; traveling block 4; and hook 5. Draw works 11 uses cable 12 to move up and down traveling block 4, top drive unit 10, and drill string 20. Traveling block 4 supports top drive unit 10. Top drive unit 10 supports drill string 20.

During drilling operations, top drive unit 10 can be used to rotate drill string 20 which enters wellbore 14. Top drive unit 10 can ride along guide rails 15 as unit 10 is moved up and down. Guide rails 15 prevent top drive unit 10 itself from rotating as top drive unit 10 rotates drill string 20. During drilling operations drilling fluid can be supplied downhole through drilling fluid line 8 and gooseneck 6.

As shown in FIG. 1B, during operations swivel 30 can be connected to rig 1 through clamp 600 and torque arm 630. Torque are 630 can be pivotally connected to swivel 30 and can resist rotational movement of swivel sleeve 150 relative to rig 1. Torque arm 630 can be slidably connected to rig 1 to allow a certain amount of longitudinal movement of swivel 30 with drill string 20.

At various times top drive operations, beyond drilling fluid, require substances to be pumped downhole, such as cement, chemicals, epoxy resins, or the like. In many cases it is desirable to supply such substances at the same time as top drive unit 10 is rotating and/or moving drill or well string 20 up and/or down and bypassing top drive unit 10 so that the substances do not damage/impair top drive unit 10. Additionally, it is desirable to supply such substances without interfering with and/or intermittently stopping longitudinal and/or rotational movements of drill or well string 20 being moved/rotated by top drive unit 10. This can be accomplished by using top drive swivel 30.

Top drive swivel 30 can be installed between top drive unit 10 and drill string 20. One or more joints of drill pipe 18 can be placed between top drive unit 10 and swivel 30. Additionally, a valve can be placed between top drive swivel 30 and top drive unit 10. Pumpable substances can be pumped through hose 31, swivel 30, and into the interior of drill string 20 thereby bypassing top drive unit 10. Top drive swivel 30 is preferably sized to be connected to drill string 20 such as 4½ inch (11.43 centimeter) IF API drill pipe or the size of the drill pipe to which swivel 30 is connected to. However, cross-over subs can also be used between top drive swivel 30 and connections to drill string 20. Two sizes for swivel 30 will be addressed in this application—a 4½ inch (11.43 centimeter) version and a 6⅝ inch (16.83 centimeter) version.

Figure 2:
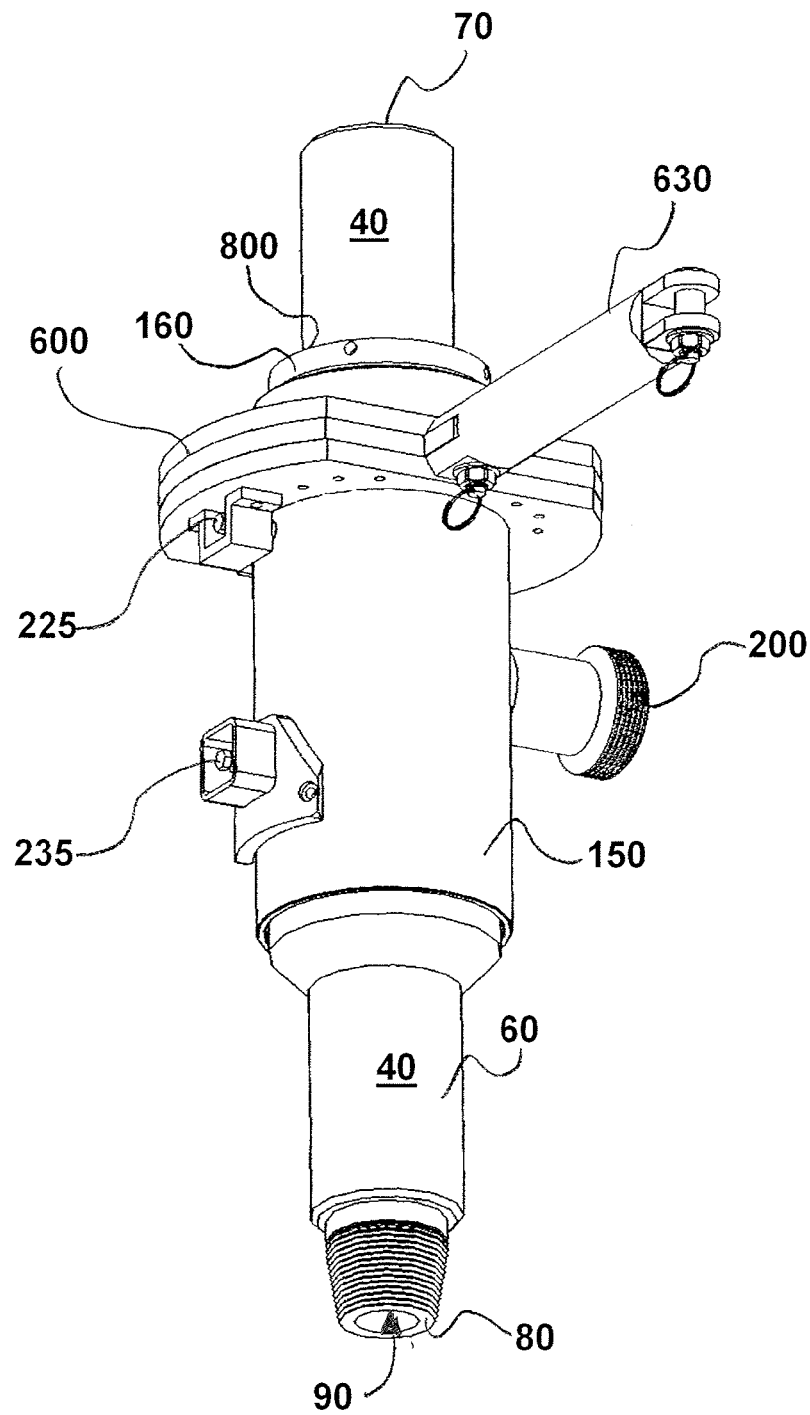
FIG. 2 is a perspective view of one embodiment of a top drive swivel.

FIG. 2 is a perspective view of one embodiment of a swivel 30. Swivel 30 can be comprised of mandrel 40 and sleeve 150. Sleeve 150 can be rotatably and sealably connected to mandrel 40. Accordingly, when mandrel 40 is rotated, sleeve 150 can remain stationary to an observer insofar as rotation is concerned. As will be discussed later inlet 200 of sleeve 150 is and remains fluidly connected to a the central longitudinal passage 90 of mandrel 40. Accordingly, while mandrel 40 is being rotated and/or moved up and down pumpable substances can enter inlet 200 and exit central longitudinal passage 90 at lower end 60 of mandrel 40.

Figure 3:
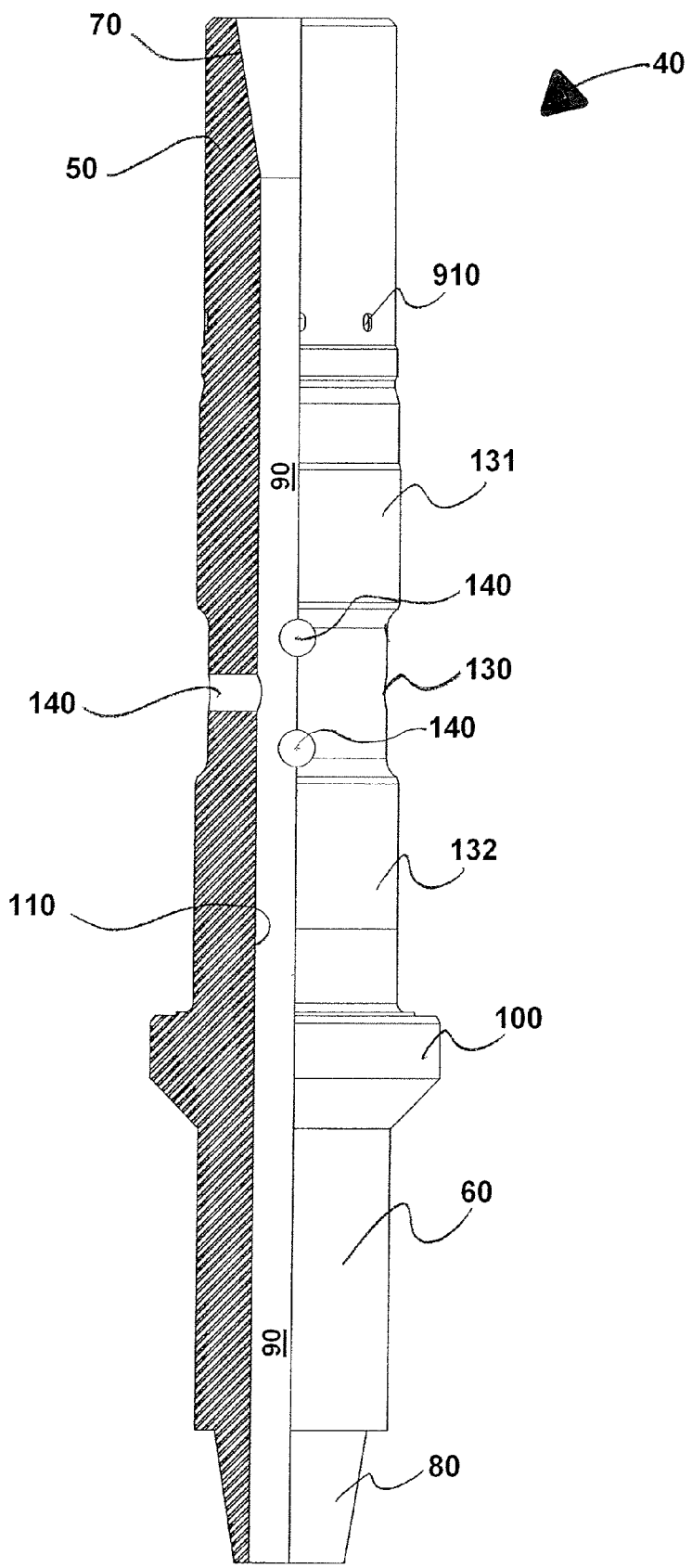
FIG. 3 is a sectional view of a mandrel which can be incorporated in the swivel of FIG. 2.

FIG. 3 is a sectional view of mandrel 40 which can be incorporated in swivel 30. Mandrel 40 can be comprised of upper end 50 and lower end 60. Central longitudinal passage 90 can extend from upper end 50 through lower end 60. Lower end 60 can include a pin connection 80 or any other conventional connection. Upper end 50 can include box connection 70 or any other conventional connection. Mandrel 40 can in effect become a part of drill string 20. Sleeve 150 can fit over mandrel 40 and become rotatably and sealably connected to mandrel 40. Mandrel 40 can include shoulder 100 to support sleeve 150. Mandrel 40 can include one or more radial inlet ports 140 fluidly connecting central longitudinal passage 90 to recessed area 130. Recessed area 130 preferably forms a circumferential recess along the perimeter of mandrel 40 and between packing support areas 131,132. In such manner recessed area 130 will remain fluidly connected with radial passage 190 and inlet 200 of sleeve 150 (see FIGS. 6 and 7A).

Mandrel 40 takes substantially all of the structural load from drill string 20. In one embodiment the overall length of mandrel 40 is preferably 52 and 5/16 inches (132.87 centimeters). Mandrel 40 can be machined from a single continuous piece of heat treated steel bar stock. NC50 is preferably the API Tool Joint Designation for the box connection 70 and pin connection 80. Such tool joint designation is equivalent to and interchangeable with 4½ inch (11.43 centimeter) IF (Internally Flush), 5 inch (12.7 centimeter) XH (Extra Hole) and 5½ inch (13.97 centimeter) DSL (Double Stream Line) connections. Additionally, it is preferred that the box connection 70 and pin connection 80 meet the requirements of API specifications 7 and 7G for new rotary shouldered tool joint connections having 6⅝ inch (16.83 centimeters) outer diameter and a 2¾ inch (6.99 centimeter) inner diameter. The Strength and Design Formulas of API 7G-Appendix A provides the following load carrying specification for mandrel 40 of top drive swivel 30: (a) 1,477,000 pounds (6,570 kilo newtons) tensile load at the minimum yield stress; (b) 62,000 foot-pounds (84 kilo newton meters) torsional load at the minimum torsional yield stress; and (c) 37,200 foot-pounds (50.44 kilo newton meters) recommended minimum make up torque. Mandrel 40 can be machined from 4340 heat treated bar stock.

In another embodiment, Mandrel 40 takes substantially all of the structural load from drill string 20. In one embodiment the overall length of mandrel 40 is preferably 67 and 13/16 inches (172.24 centimeters). Mandrel 40 can be machined from a single continuous piece of heat treated steel bar stock. 6⅝ inch (16.83 centimeters) FH is preferably the API Tool Joint Designation for the box connection 70 and pin connection 80. Additionally, it is preferred that the box connection 70 and pin connection 80 meet the requirements of API specifications 7 and 7G for new rotary shouldered tool joint connections having 8½ inch (21.59 centimeter) outer diameter and a 4¼ inch (10.8 centimeter) inner diameter. The Strength and Design Formulas of API 7G-Appendix A provides the following load carrying specification for mandrel 40 of top drive swivel 30: (a) 2,094,661 pounds (9,318 kilo newtons) tensile load at the minimum yield stress; (b) 109,255 foot-pounds (148.1 kilo newton meters) torsion load at the minimum torsional yield stress; and (c) 65,012 foot-pounds (88.14 kilo newton meters) recommended minimum make up torque. Mandrel 40 can be machined from 4340 heat treated bar stock.

To reduce friction between mandrel 40 and packing units 305, 405 and increase the life expectancy of packing units 305, 405, packing support areas 131, 132 can be coated and/or sprayed welded with a materials of various compositions, such as hard chrome, nickel/chrome or nickel/aluminum (95 percent nickel and 5 percent aluminum) A material which can be used for coating by spray welding is the chrome alloy TAFA 95MX Ultrahard Wire (Armacor M) manufactured by TAFA Technologies, Inc., 146 Pembroke Road, Concord N.H. TAFA 95 MX is an alloy of the following composition: Chromium 30 percent; Boron 6 percent; Manganese 3 percent; Silicon 3 percent; and Iron balance. The TAFA 95 MX can be combined with a chrome steel. Another material which can be used for coating by spray welding is TAFA BOND-ARC WIRE-75B manufactured by TAFA Technologies, Inc. TAFA BONDARC WIRE-75B is an alloy containing the following elements: Nickel 94 percent; Aluminum 4.6 percent; Titanium 0.6 percent; Iron 0.4 percent; Manganese 0.3 percent; Cobalt 0.2 percent; Molybdenum 0.1 percent; Copper 0.1 percent; and Chromium 0.1 percent. Another material which can be used for coating by spray welding is the nickel chrome alloy TAFALOY NICKEL-CHROME-MOLY WIRE-71T manufactured by TAFA Technologies, Inc. TAFALOY NICKEL-CHROME-MOLY WIRE-71T is an alloy containing the following elements: Nickel 61.2 percent; Chromium 22 percent; Iron 3 percent; Molybdenum 9 percent; Tantalum 3 percent; and Cobalt 1 percent. Various combinations of the above alloys can also be used for the coating/spray welding. Packing support areas 131, 132 can also be coated by a plating method, such as electroplating. The surface of support areas 131, 132 can be ground/polished/finished to a desired finish to reduce friction and wear between support areas 131, 132 and packing units 305, 415.

Figure 4:
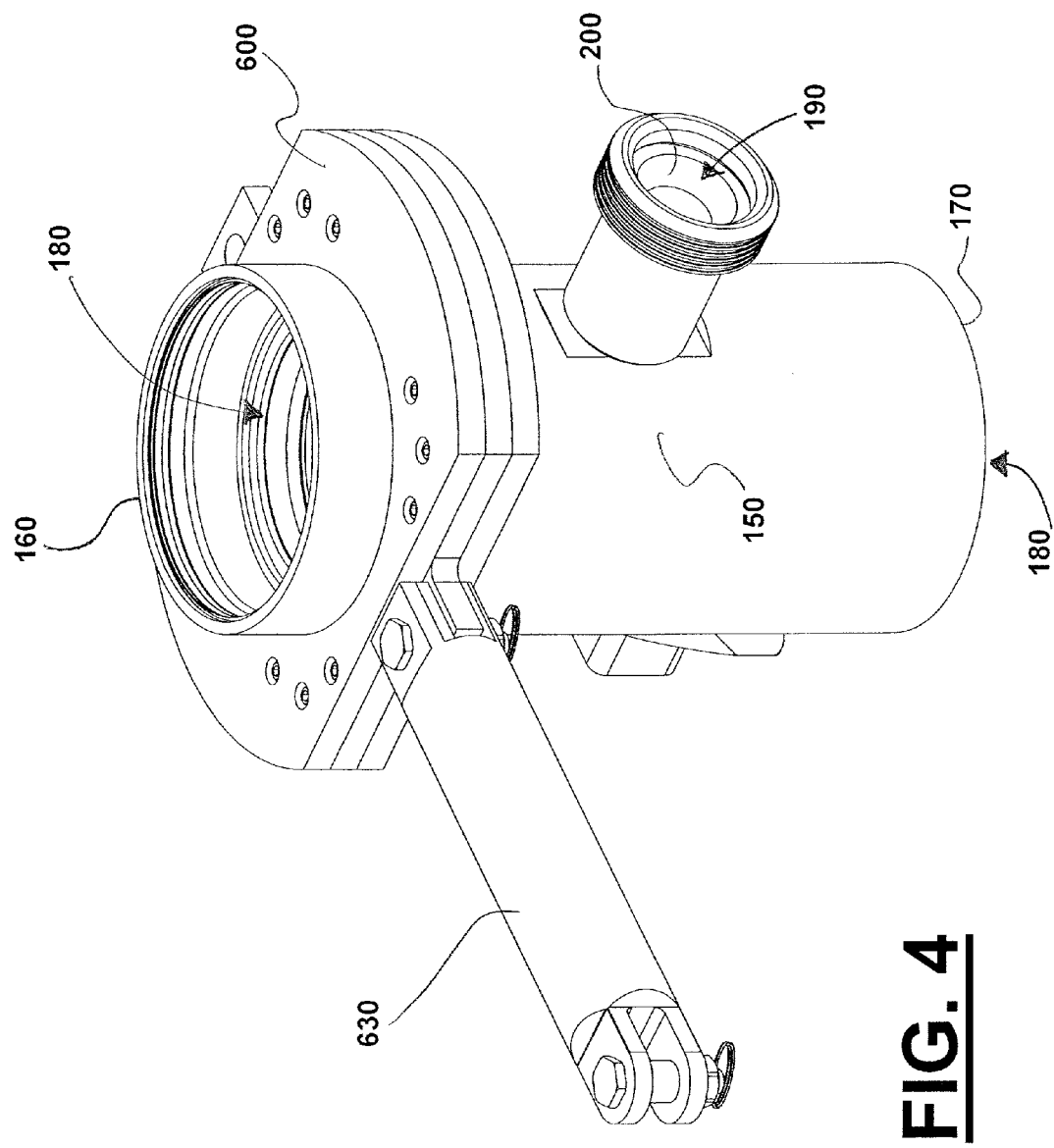
FIG. 4 is a perspective view of a sleeve, clamp, and torque arm which can be incorporated into the swivel of FIG. 2.
Figure 5:
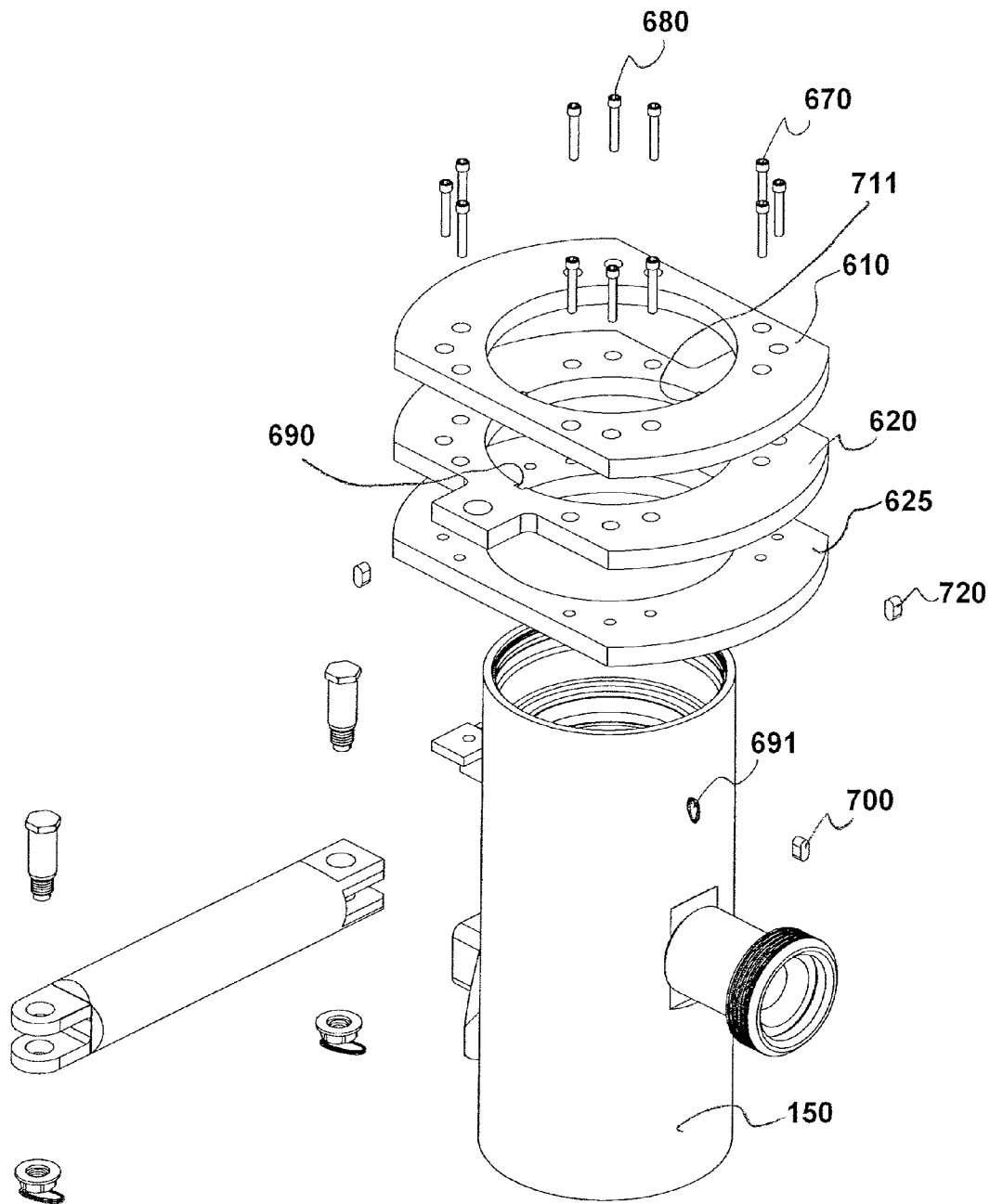
FIG. 5 is an exploded view of the sleeve, clamp, and torque arm of FIG. 4.
Figure 6:
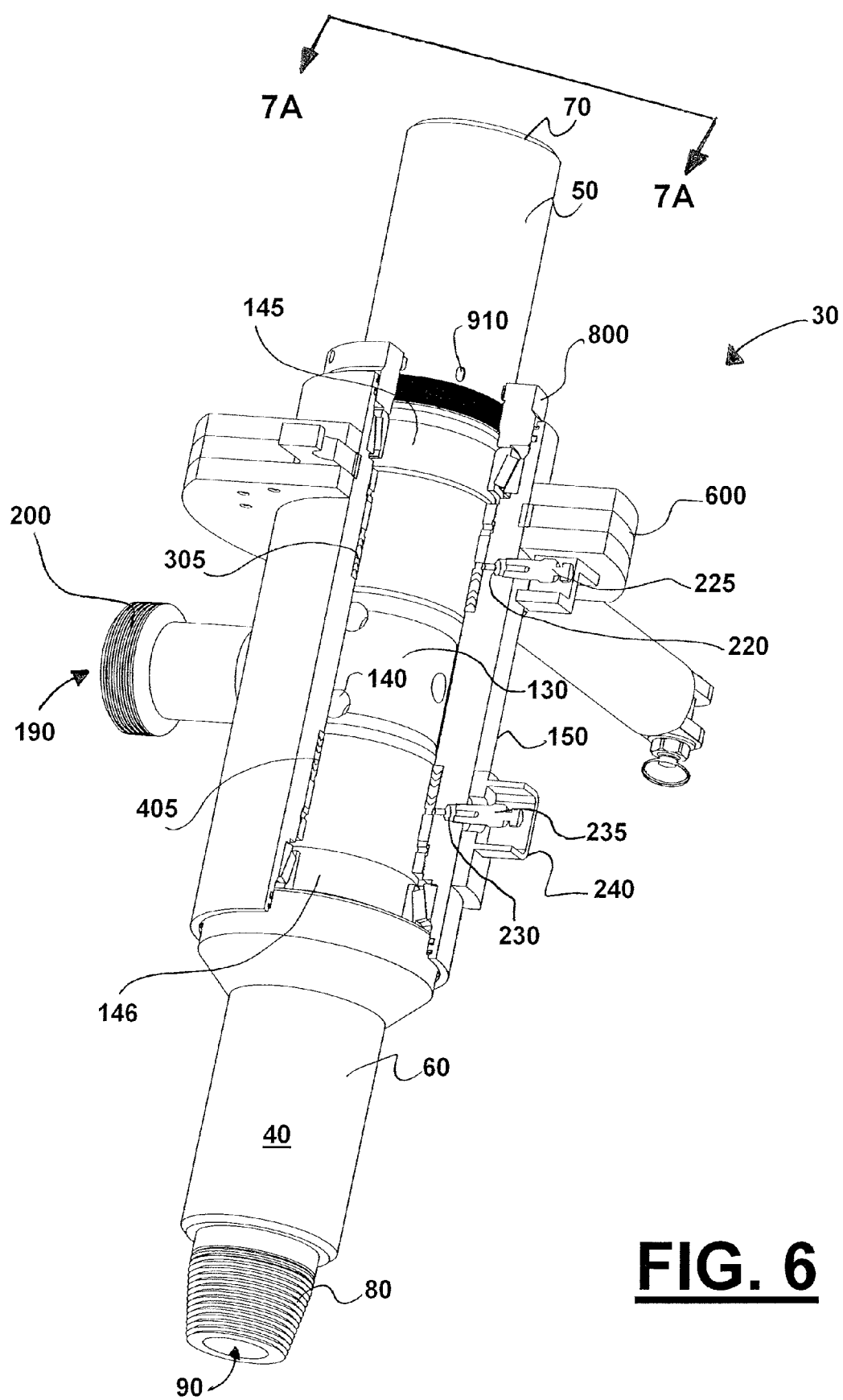
FIG. 6 is a cutaway perspective view of the swivel of FIG. 2.
Figure 7A:
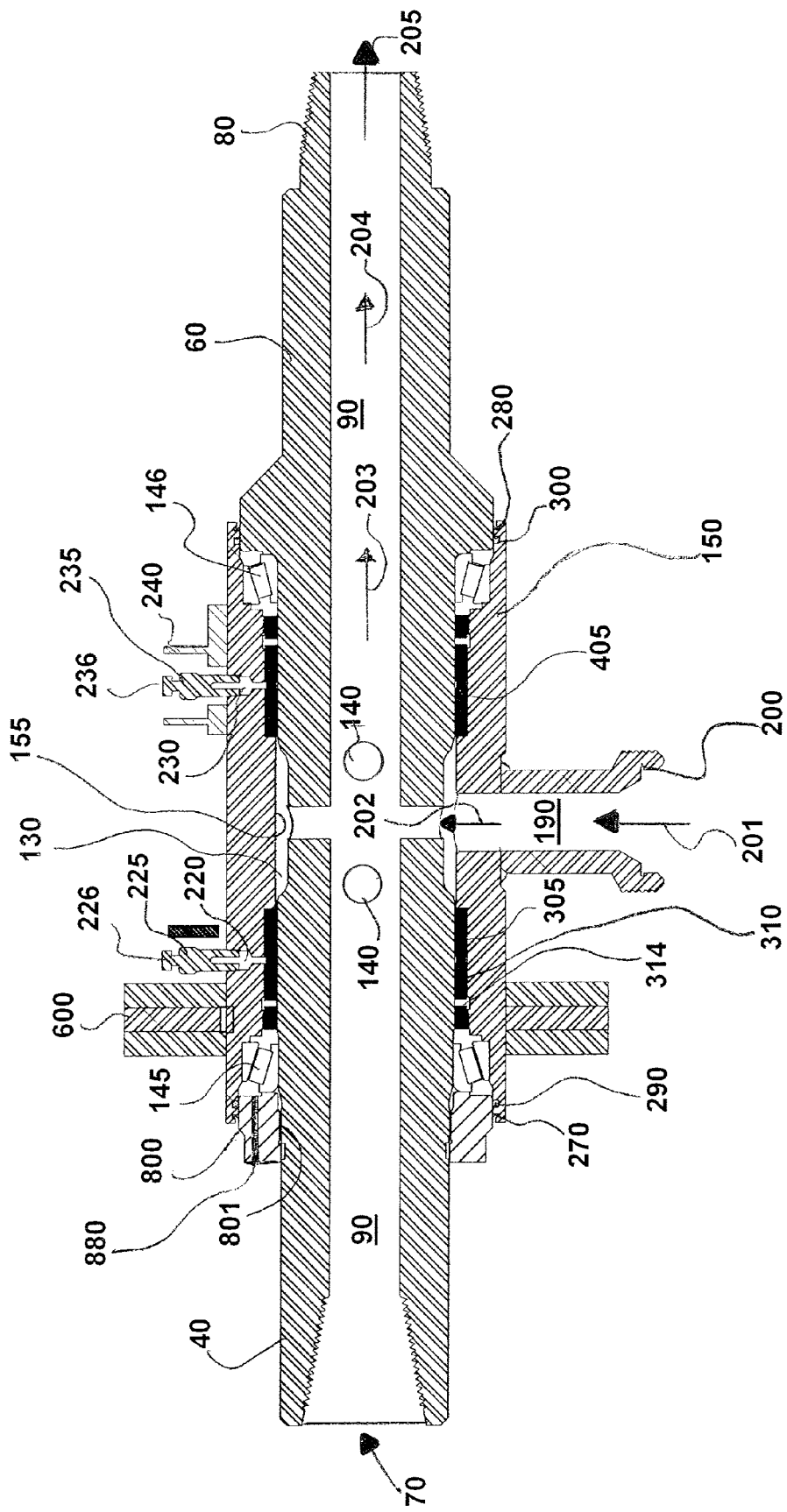
FIGS. 7A and 7B include a sectional view of the swivel of FIG. 2 along with an enlarged sectional view of the packing area.

FIG. 4 is a perspective view of a sleeve 150, clamp 600, and torque arm 630 which can be incorporated into swivel 30. FIG. 5 is an exploded view of the components shown in FIG. 4. FIG. 6 is a cutaway perspective view of swivel 30. FIG. 7A is a sectional view of swivel 30 taken along the line 7A-7A of FIG. 6.

FIG. 6 is an overall perspective view (and partial sectional view) of top drive swivel 30. Sleeve 150 is shown rotatably connected to mandrel 40. Bearings 145, 146 allow sleeve 150 to rotate in relation to mandrel 40. Packing units 305, 405 sealingly connect sleeve 150 to mandrel 40. Retaining nut 800 retains sleeve 150 on mandrel 40. Inlet 200 of sleeve 150 is fluidly connected to central longitudinal passage 90 of mandrel 40. Accordingly, while mandrel 40 is being rotated and/or moved up and down pumpable substances can enter inlet 200 and exit central longitudinal passage 90 at lower end 60 of mandrel 40. Recessed area 130 forms a peripheral recess between mandrel 40 and sleeve 150. The fluid pathway from inlet 200 to outlet at lower end 60 of central longitudinal passage 90 is as follows: entering inlet 200; passing through radial passage 190; passing through recessed area 130; passing through one of the plurality of radial inlet ports 40; passing through central longitudinal passage 90; and exiting mandrel 40 through central longitudinal passage 90 at lower end 60 and pin connection 80.

Sleeve 150 can include central longitudinal passage 180 extending from upper end 160 through lower end 170. Sleeve 150 can also include radial passage 190 and inlet 200. Inlet 200 can be attached by welding or any other conventional type method of fastening such as a threaded connection. If welded the connection is preferably heat treated to remove residual stresses created by the welding procedure. Lubrication port 210 (not shown) can be included to provide lubrication for interior bearings. Packing ports 220, 230 can also be included to provide the option of injecting packing material into the packing units 305,405. A protective cover 240 can be placed around packing port 230 to protect packing injector 235. Optionally, a second protective cover can be placed around packing port 220. Sleeve 150 can include a groove 691 for insertion of a key 700. FIG. 7A illustrates how central longitudinal passage 90 is fluidly connected to inlet 200 through radial passage 190.

Sleeve 150 slides over mandrel 40. Bearings 145, 146 rotatably connect sleeve 150 to mandrel 40. Bearings 145, 146 are preferably thrust bearings although many conventionally available bearing will adequately function, including conical and ball bearings. Packing units 305, 405 sealingly connect sleeve 150 to mandrel 40. Inlet 200 of sleeve 150 is and remains fluidly connected to central longitudinal passage 90 of mandrel 40. Accordingly, while mandrel 40 is being rotated and/or moved up and down pumpable substances can enter inlet 200 and exit central longitudinal passage 90 at lower end 60 of mandrel 40. Recessed area 130 forms a peripheral recess between mandrel 40 and sleeve 150. The fluid pathway from inlet 200 to outlet at lower end 60 of central longitudinal passage 90 is as follows: entering inlet 200 (arrow 201); passing through radial passage 190 (arrow 202); passing through recessed area 130 (arrow 202); passing through one of the plurality of radial inlet ports 140 (arrow 202), passing through central longitudinal passage 90 (arrow 203); and exiting mandrel 40 via lower end 60 at pin connection 80 (arrows 204, 205).

Sleeve 150 is preferably fabricated from 4140 heat treated round mechanical tubing having the following properties: (120,000 psi (827,400 kilo pascal) minimum tensile strength, 100,000 psi (689,500 kilo pascal) minimum yield strength, and 285/311 Brinell Hardness Range). In one embodiment the external diameter of sleeve 150 is preferably about 11 inches (27.94 centimeters). Sleeve 150 preferably resists high internal pressures of fluid passing through inlet 200. Preferably top drive swivel 30 with sleeve 150 will withstand a hydrostatic pressure test of 12,500 psi (86,200 kilo pascal). At this pressure the stress induced in sleeve 150 is preferably only about 24.8 percent of its material's yield strength. At a preferable working pressure of 7,500 psi (51,700 kilo pascal), there is preferably a 6.7:1 structural safety factor for sleeve 150.

To minimize flow restrictions through top drive swivel 30, large open areas 140 are preferred. Preferably each area of interest throughout top drive swivel 30 is larger than the inlet service port area 200. Inlet 200 is preferably 3 inches having a flow area of 4.19 square inches (27.03 square centimeters). In one embodiment the flow area of the annular space between sleeve 150 and mandrel 40 is preferably 20.81 square inches (134.22 square centimeters). The flow area through the plurality of radial inlet ports 140 is preferably 7.36 square inches (47.47 square centimeters). The flow area through central longitudinal bore 90 is preferably 5.94 square inches 38.31 square centimeters).

Retainer nut 800 can be used to maintain sleeve 150 on mandrel 40. Retainer nut 800 can threadably engage mandrel 40 at threaded area 801. Set screw 890 can be used to lock in place retainer nut 800 and prevent nut 800 from loosening during operation. A set screw 890 (not shown for clarity) can threadably engages retainer nut 800 through bore 900 (not shown for clarity) and sets in one of a plurality of receiving portions 910 formed in mandrel 40. Retaining nut 800 can also include grease injection fitting 880 for lubricating bearing 145. A wiper ring 271 (not shown for clarity) can be set in area 270 protects against dirt and other items from entering between the sleeve 150 and mandrel 40. A grease ring 291 (not shown for clarity) can be set in area 290 for holding lubricant for bearing 145.

Bearing 146 can be lubricated through a grease injection fitting 211 and lubrication port 210 (not shown for clarity).

FIGS. 4 and 5 best show clamp 600 which can be incorporated into top drive swivel 30. FIG. 5 is an exploded view of clamp 600. Clamp 600 can comprises first portion 610, second portion 620, and third portion 625. First, second, and third portions 610, 620, 625 can be removably attached by plurality of fasteners 670, 680. Key 700 can be inserted in keyway 690 of clamp 600. A corresponding keyway 691 is included in sleeve 150 of top drive swivel 30. Keyways 690, 691 and key 700 prevent clamp 600 from rotating relative to sleeve 150. A second key 720 can be installed in keyways 710, 711. Third, fourth, and additional keys/keyways can be used as desired.

Shackles can be attached to clamp 600 to facilitate handing top drive swivel 30 when clamp 600 is attached. Torque arm 630 can be pivotally attached to clamp 600 and allow attachment of clamp 600 (and sleeve 150) to a stationary part of top drive rig 1 preventing sleeve 150 from rotating while drill string 20 is being rotated by top drive 10 (and top drive swivel 30 is installed in drill string 20). Torque arm 630 can be provided with holes for attaching restraining shackles. Restrained torque arm 630 prevents sleeve 150 from rotating while mandrel 40 is being spun. Otherwise, frictional forces between packing units 305, 405 and packing support areas 131, 135 of rotating mandrel 40 would tend to also rotate sleeve 150. Clamp 600 is preferably fabricated from 4140 heat treated steel being machined to fit around sleeve 150.

Figure 7B:
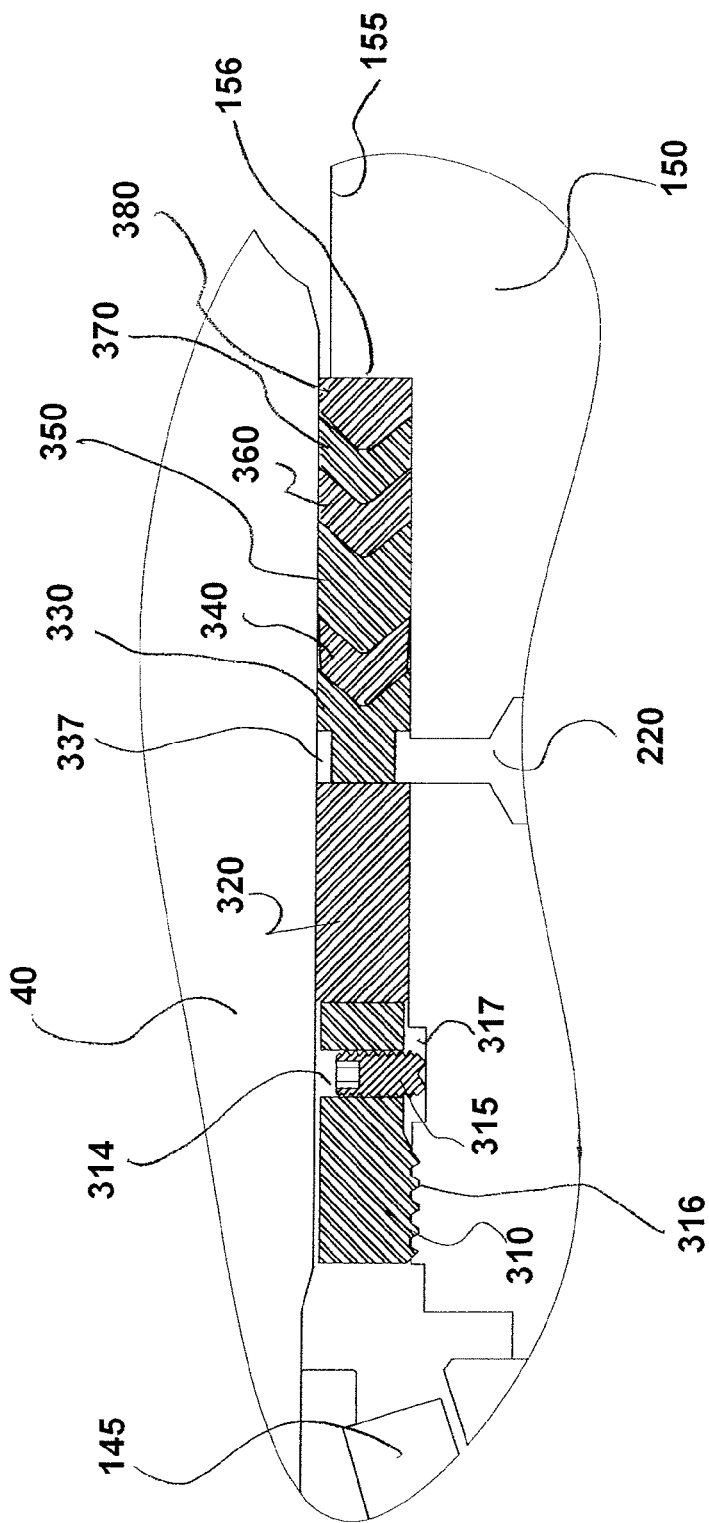
Figure 8:
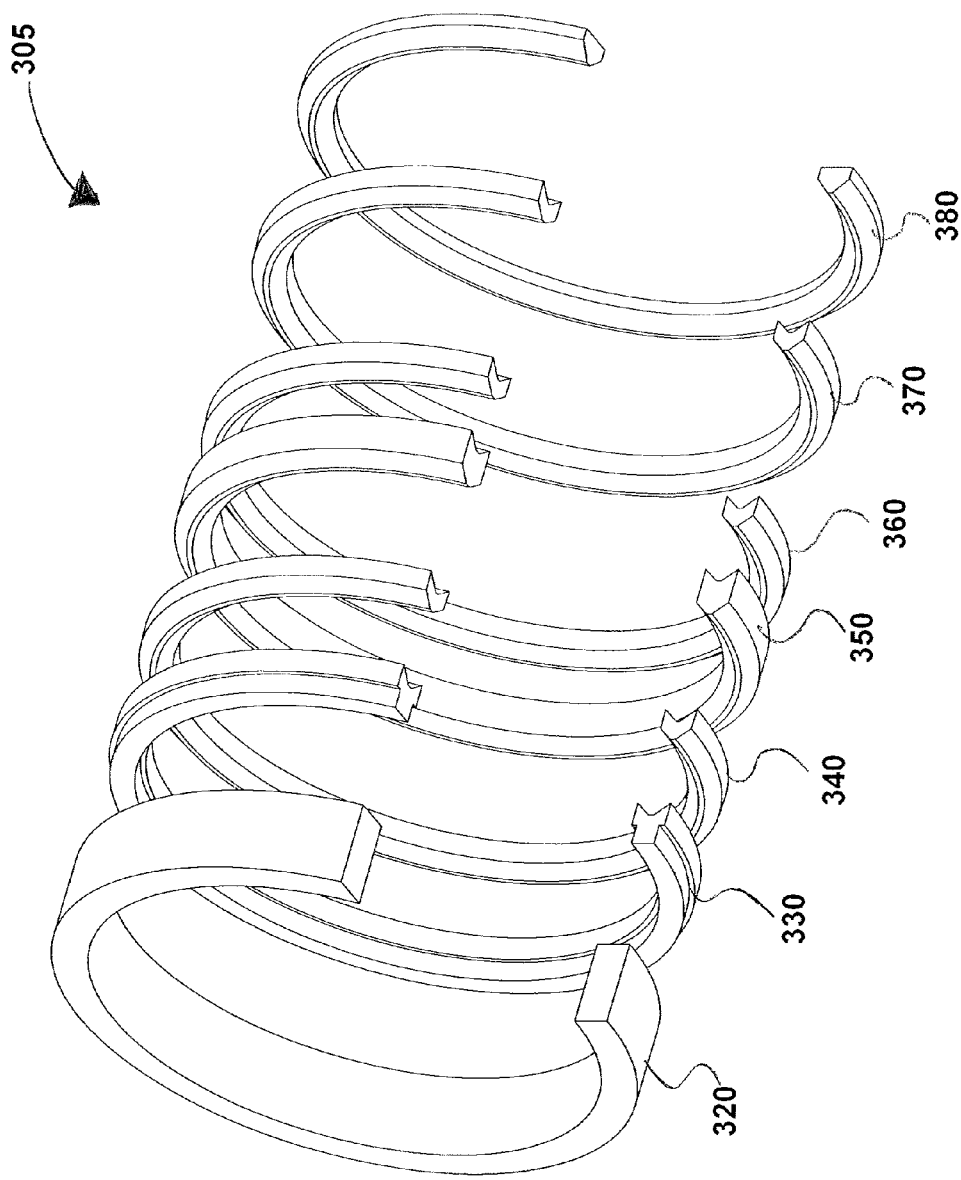
FIG. 8 is an exploded view of a set of packing which can be incorporated into the swivel of FIG. 2.
Figure 18:
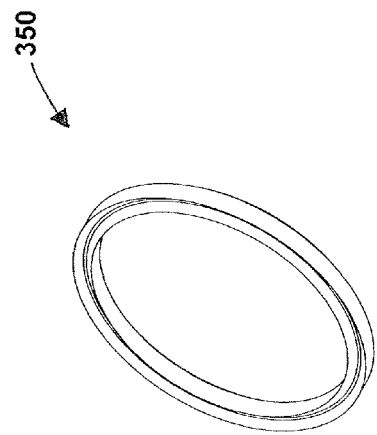
FIG. 18 is a perspective view of a rope seal.
Figure 19:
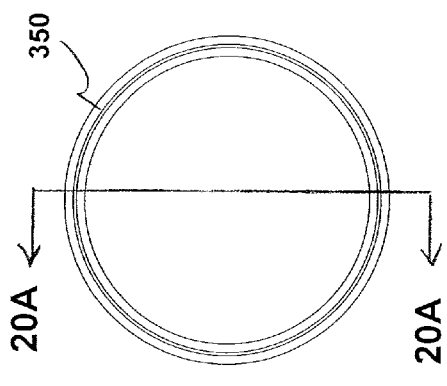
FIG. 19 is a top view of the rope seal of FIG. 18.
Figure 20A:
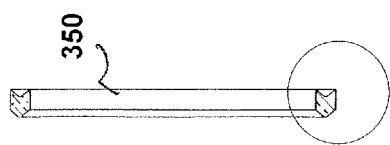
FIG. 20A is a sectional side view of the rope seal of FIG. 18.
Figure 20B:
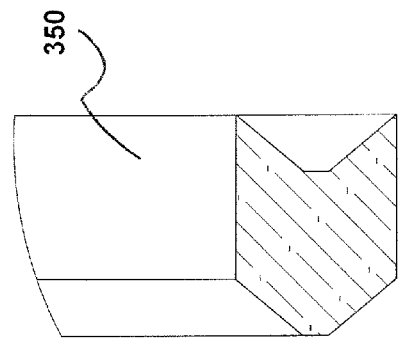
FIG. 20B is an enlarged sectional side view of the rope seal of FIG. 18.
Figure 25:
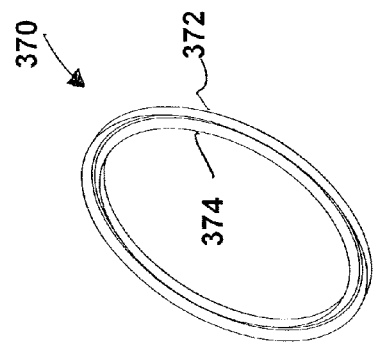
FIG. 25 is a top view of the seal ring of FIG. 24.
Figure 26A:
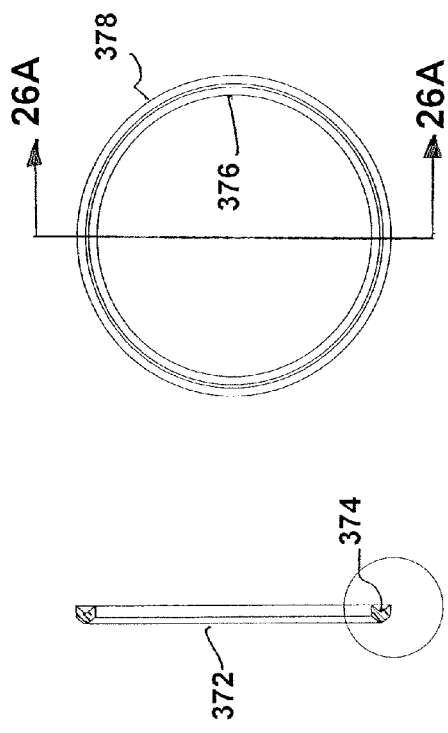
FIG. 26A is a sectional side view of the seal ring of FIG. 24.
Figure 26B:
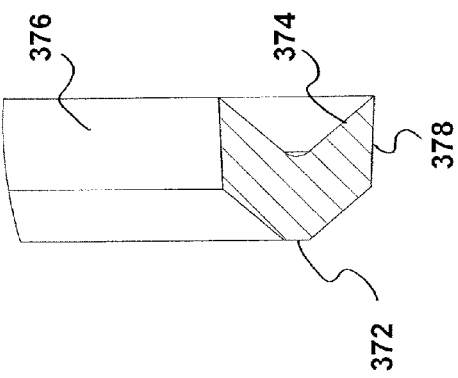
FIG. 26B is an enlarged sectional side view of the seal ring of FIG. 24.

FIG. 8 shows a blown up schematic view of packing unit 305. FIG. 7B shows a sectional view through packing area 305. Packing unit 305 can comprise female packing end 330; packing ring 340, packing lubrication ring 350, packing ring 360, packing ring 370, and packing end 380. Packing unit 305 sealing connects mandrel 40 and sleeve 150. Packing unit 305 can be encased by packing retainer nut 310, spacer 320, and shoulder 156 of protruding section 155. Packing retainer nut 310 can be a ring which threadably engages sleeve 150 at threaded area 316. Packing retainer nut 310 and shoulder 156 squeeze packing unit 305 to obtain a good seal between mandrel 40 and sleeve 150. Set screw 315 can be used to lock packing retainer nut 310 in place and prevent retainer nut 310 from loosening during operation. Set screw 315 can be threaded into bore 314 and lock into receiving area 317 on sleeve 150. Packing unit 405 (shown in FIG. 7A) can be constructed substantially similar to packing unit 305. The materials for packing unit 305 and packing unit 405 can be similar.

Spacer 320 can comprise, first end 322, second end 324, internal surface 326, and external surface 328. Spacer 320 can be sized based on the amount of squeezed to be applied to packing unit 305 when packing retainer nut 310 is tightened. It is preferably fabricated or machined from bronze.

Packing end 330 is preferably a female packing end comprised of a bearing grade peak or stiffened bronze material. Female packing ring or end 330 can comprise tip 332 with concave portion 331. Concave portion 331 can have an angle of about 130 degrees at its center. Tip 332 can include side 333, recessed area 334, peripheral groove 337 and inner diameter 335. Recessed area 334 and inner diameter 335 can be configured to minimize contact of female packing ring or end 330 with mandrel 40. Instead, contact will be made between packing ring 340 and mandrel 40. It is believed that minimizing contact between female packing ring or end 330 and mandrel 40 will reduce heat buildup from friction and extend the life of the packing unit. It is also believed that packing ring 340 performs the great majority of sealing against high pressure fluids (such as pressures above about 3,000 or about 4,000 psi (20,700 kilo pascals or 27,600 kilo pascals)). It is also believed that packing rings 370 and/or 360 perform the majority of sealing against lower pressure fluids. Female packing ring 330 can include a plurality of radial ports 336 fluidly connecting peripheral groove 337 with interior groove 338 to allow packing injected to evenly distribute around ring and into the actual sealing rings.

Packing ring 340 can comprise tip 342, base 344, internal surface 346, and external surface 348. Tip 342 can have an angle of about 120 degrees to have an non-interference fit with tip 332 of female packing end 330 which is at about 130 degrees Base 344 can have an angle of about 120 degrees. Packing ring 340 is preferably a "Vee" packing ring—comprised of bronze filled teflon such as that supplied by CDI material number 714. Tip 342 of packing ring 340 is made at about 120 degrees (which is blunter than the conventional 90 degree tips) in an attempt to limit the braking effect (e.g., caused by expansion of recessed area 334 of the female packing ring or end 330 which would cause side 333 of female packing ring to contact mandrel 40) on mandrel 40 when longitudinal force is applied through the packing Base 344 being at about 120 degrees is believed to assist in causing packing ring 340 to bear against mandrel 40, and not side 333 of female packing ring 330.

Packing lubrication ring 350, preferably includes at least one rope seal such as a Garlock ½ inch (or ⁷⁄₁₆ inch or ⅜ inch) (1.27 centimeters, or 1.11 centimeters, or 0.95 centimeters) section 8913 Rope Seal. Rope seals have surprisingly been found to extend the life of other seals in the packing unit. This is thought to be by secretion of lubricants, such as graphite, during use over time. Although shown in a "Vee" type shape, rope seals typically have a square cross section and form to the shape of the area to which they are confined. Here, lubrication ring 350 is shown after be shaped by packing rings 340 and 360.

Packing ring 360 can comprise tip 362, base 364, internal surface 366, and external surface 368. Tip 362 can have an angle of about 90 degrees. Base 364 can have an angle of about 120 degrees. 90 degrees for the tip and 120 degrees for the base are conventional angles. The larger angle for the base allows thermal expansion of the tip in the base. Packing ring 360 is preferably a "Vee" packing ring—comprised of hard rubber such as that supplied by CDI material number 850 or viton such as that supplied by CDI material number 951.

Packing rings 360, 370 can have substantially the same geometric construction. Packing ring 370 can comprise tip 372, base 374, internal surface 376, and external surface 378. Tip 372 can have an angle of about 90 degrees. Base 374 can have an angle of about 120 degrees. 90 degrees for the tip and 120 degrees for the base are conventional angles. The larger angle for the base allows thermal expansion of the tip in the base. Packing ring 370 is preferably a "Vee" packing ring—comprised of teflon such as that supplied by CDI material number 711.

In an alternative embodiment both packing rings 360 and 370 are "Vee" packing rings—comprised of teflon such as that supplied by CDI material number 711.

In another alternative embodiment packing ring 370 can be a "Vee" packing ring—comprised of hard rubber such as that supplied by CDI material number 850 or viton such as that supplied by CDI material number 951; and Packing ring 360 can be a "Vee" packing ring—comprised of teflon such as that supplied by CDI material number 711.

Male packing end or ring 380 can comprise tip 382, base 384, internal surface 386, and external surface 388. Tip 382 can have an angle of about 90 degrees. Packing end 380 is preferably an aluminum bronze male packing ring.

Various alternative materials for packing rings can be used such as standard chevron packing rings of standard packing materials.

Using the above packing configuration it has been surprisingly found that packing life in a displacement job at high pressure can be extended from about 45 minutes to about 10 hours, at rotation speeds of about 30, about 40, about 50, and about 60 revolutions per minute.

In installing packing units 305, 405, it has been found that the packing units should first be compressed in a longitudinal direction between sleeve 150 and a dummy cylinder (the dummy cylinder serving as mandrel 40) before sleeve 150 is installed on mandrel 40. This is because a certain amount of longitudinal compression of packing units 305, 405 will occur when fluid pressure is first exerted on these packing units. This longitudinal compression will be taken up by the respective packing retainer nuts 310. However, using a dummy cylinder allows the individual packing retainer nuts 310 to cause pre-fluid pressure longitudinal compression on packing units 305, 405, but still allow the seals to maintain an internal diameter consistent with the external diameter of mandrel 40. Such a procedure can avoid the requirement of resetting the individual packing retainer nuts 310 after fluid pressure is applied to the packing units causing longitudinal compression.

Female packing ring or end 330 can include a packing injection option. Injection fitting 225 can be used to inject additional packing material such as teflon into packing unit 305. Head 226 for injection fitting 225 can be removed and packing material can then be inserted into fitting 225. Head 226 can then be screwed back into injection fitting 225 which would push packing material through fitting 225 and into packing port 220. The material would then be pushed into packing ring or end 330. Packing ring or end 330 can comprise a plurality of radial ports 336, outer peripheral groove 337, and inner peripheral groove 338. The material would proceed through outer groove 337, through the plurality of radial ports 336, and through inner peripheral groove 338 causing a sealing effect. The interaction between injection fitting 235 and packing unit 405 can be substantially similar to the interaction between injection fitting 225 and packing unit 305. A conventionally available material which can be used for packing injection fittings 225, 235 is DESCO™ 625 Pak part number 6242-12 in the form of a 1 inch by ⅜ inch (2.54 centimeter by 0.95 centimeter) stick and distributed by Chemola Division of South Coast Products, Inc., Houston, Tex.

Injection fittings 225, 235 have a dual purpose: (a) provide an operator a visual indication whether there has been any leakage past either packing units 305, 405 and (b) allow the operator to easily inject additional packing material and stop seal leakage without removing top drive swivel 30 from drill string 20.

FIGS. 30A through 50 show an alternative packing arrangement for packing units 305, 405. In this alternative arrangement spacer 420 can include a plurality of radial ports for injecting packing filler material.

Figure 30A:
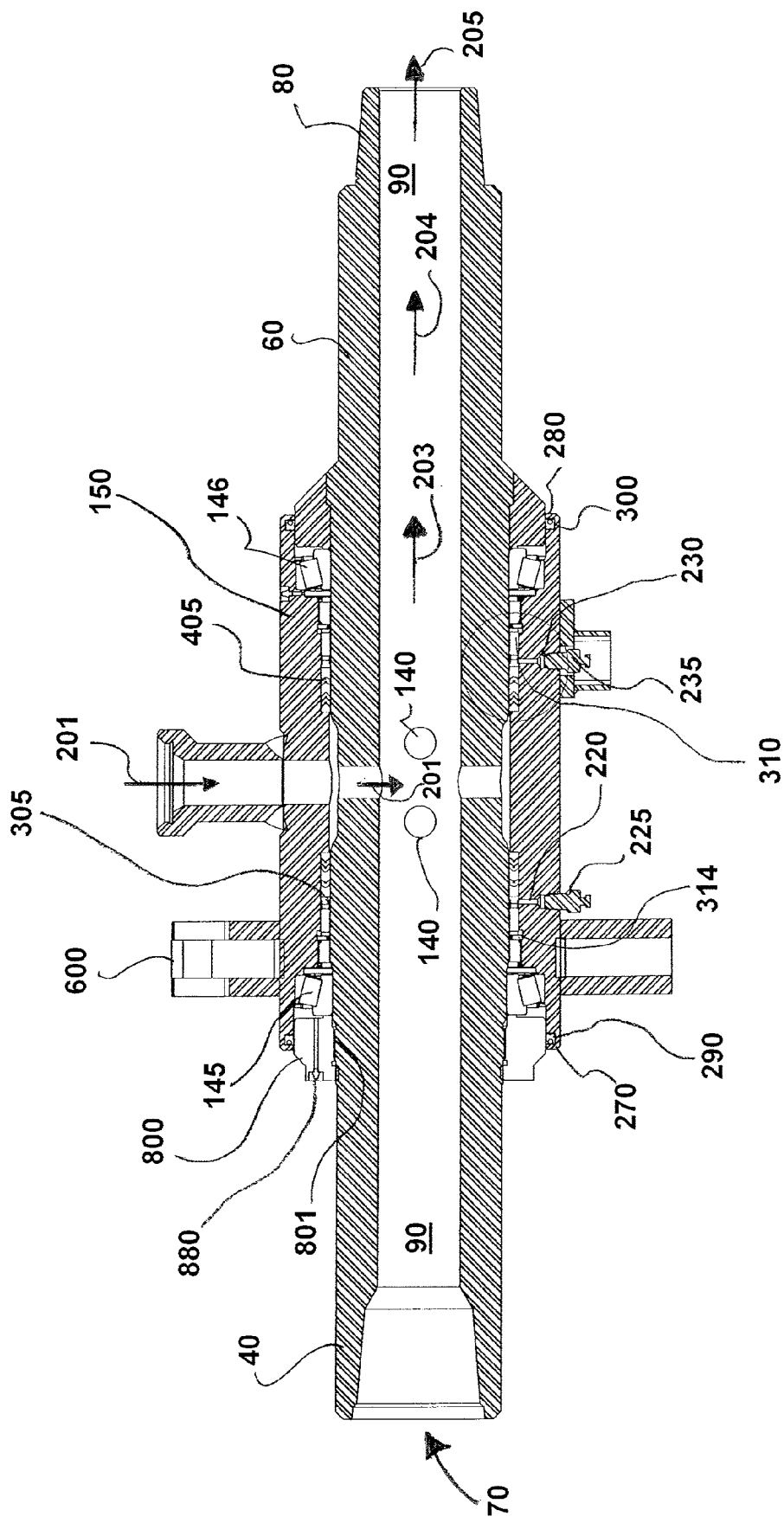
FIGS. 30A and 30B include a sectional view of another embodiment of the swivel of FIG. 2 along with an enlarged sectional view of the packing area.
Figure 30B:
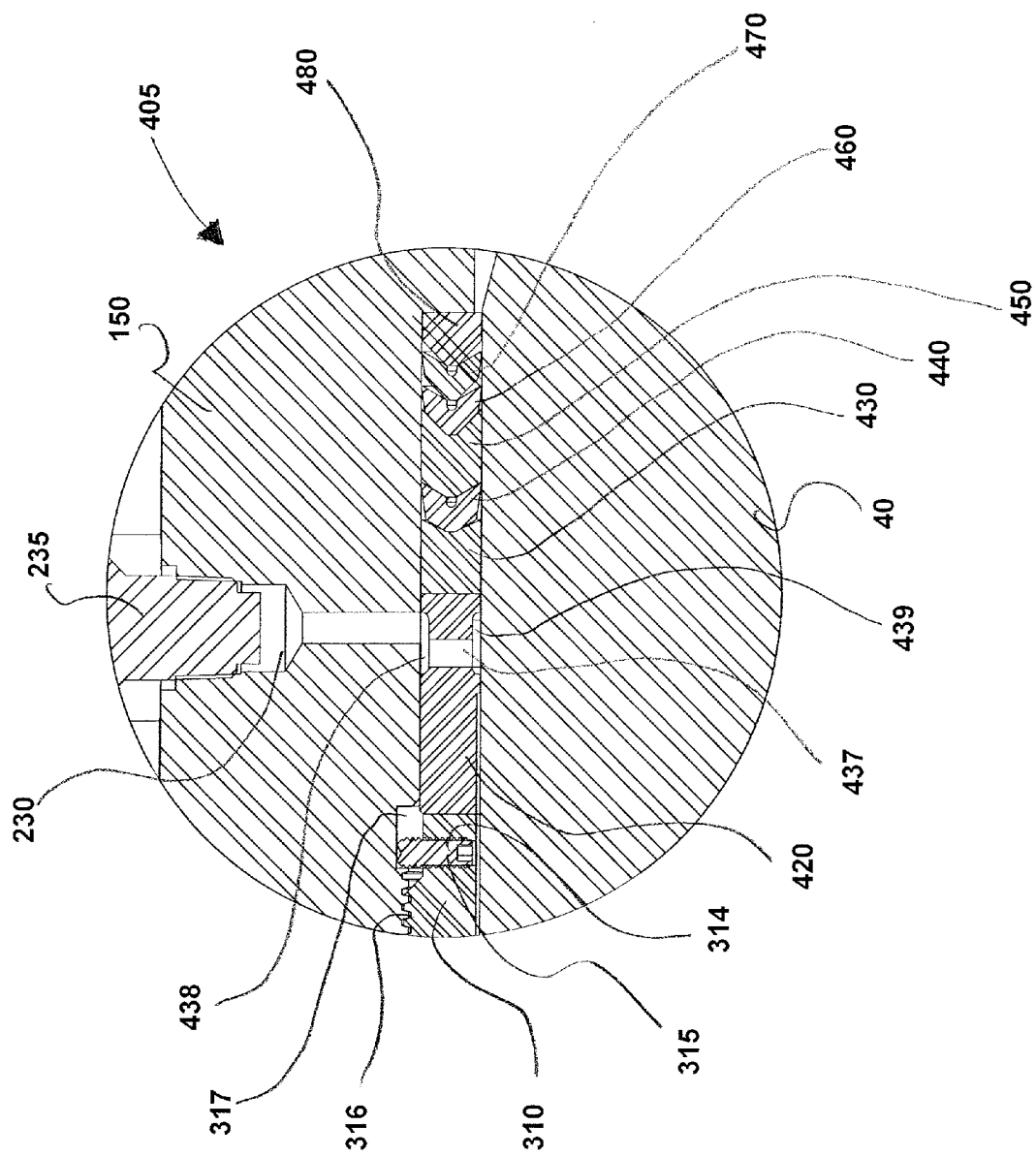
Figure 31:
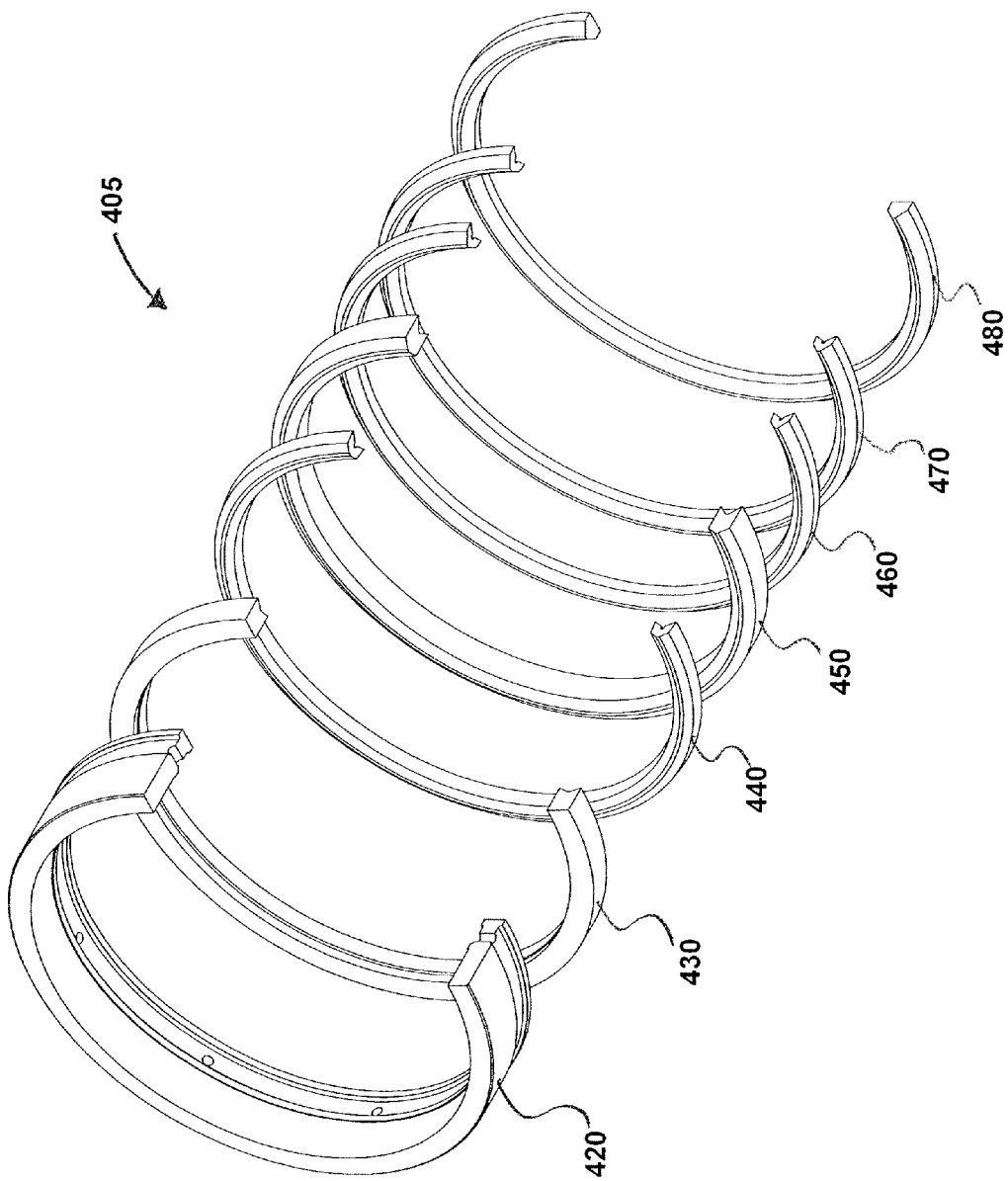
FIG. 31 is an exploded view of a set of packing which can be incorporated into the swivel of FIG. 30A.
Figure 47:
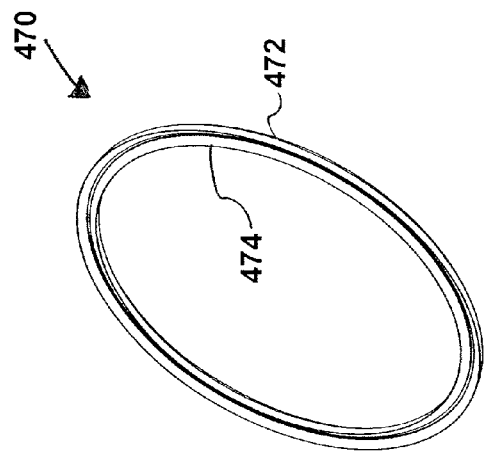
FIG. 47 is a perspective view of a seal ring.
Figure 48:
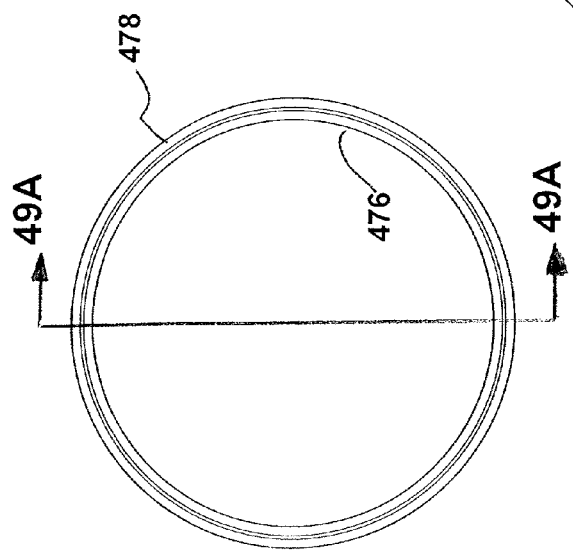
FIG. 48 is a top view of the seal ring of FIG. 47.
Figure 49A:
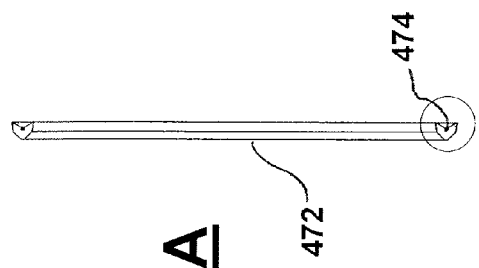
FIG. 49A is a sectional side view of the seal ring of FIG. 47.
Figure 49B:
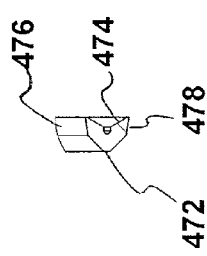
FIG. 49B is an enlarged sectional side view of the seal ring of FIG. 47.

FIG. 31 shows a blown up schematic view of packing unit 405. FIG. 30B shows a sectional view through packing unit 405. Packing unit 405 can comprise female packing end 430; packing ring 440, packing lubrication ring 450, packing ring 460, packing ring 470, and packing end 480. Packing unit 405 sealing connects mandrel 40 and sleeve 150. Packing unit 405 can be encased by packing retainer nut 310, spacer 420, and shoulder 156 of protruding section 155. Packing retainer nut 310 can be a ring which threadably engages sleeve 150 at threaded area 316. Packing retainer nut 310 and shoulder 156 squeeze packing unit 405 to obtain a good seal between mandrel 40 and sleeve 150. Set screw 315 can be used to lock packing retainer nut 310 in place and prevent retainer nut 310 from loosening during operation. Set screw 315 can be threaded into bore 314 and lock into receiving area 317 on sleeve 150. An upper packing unit can be constructed substantially similar to packing unit 405. The materials for packing unit 405 and upper packing unit can be similar.

Spacer 420 can comprise, first end 421, second end 422, internal surface 423, and external surface 424. Spacer 420 can be sized based on the amount of squeezed to be applied to packing unit 405 when packing retainer nut 310 is tightened. It is preferably fabricated or machined from bronze.

Packing end 430 is preferably a female packing end comprised of a bearing grade peak or stiffened bronze material. Female packing ring or end 430 can comprise tip 432 with concave portion 431. Concave portion 431 can have an angle of about 130 degrees at its center. Tip 442 can include side 433, recessed area 44, peripheral groove 47 and inner diameter 445. Recessed area 434 and inner diameter 435 can be configured to minimize contact of female packing ring or end 430 with mandrel 40. Instead, contact will be made between packing ring 440 and mandrel 40. It is believed that minimizing contact between female packing ring or end 430 and mandrel 40 will reduce heat buildup from friction and extend the life of the packing unit. It is also believed that packing ring 440 performs the great majority of sealing against high pressure fluids (such as pressures above about 3,000 or about 4,000 psi) (20,700 kilo pascals or 27,600 kilo pascals). It is also believed that packing rings 470 and/or 460 perform the majority of sealing against lower pressure fluids.

Packing ring 440 can comprise tip 442, base 444, internal surface 446, and external surface 448. Tip 442 can have an angle of about 120 degrees to have an non-interference fit with tip 432 of female packing end 430 which is at about 130 degrees Base 444 can have an angle of about 120 degrees. Packing ring 440 is preferably a "Vee" packing ring—comprised of bronze filled teflon such as that supplied by CDI material number 714. Tip 442 of packing ring 440 is made at about 120 degrees (which is blunter than the conventional 90 degree tips) in an attempt to limit the braking effect (e.g., caused by expansion of recessed area 434 of the female packing ring or end 430 which would cause side 433 of female packing ring to contact mandrel 40) on mandrel 40 when longitudinal force is applied through the packing Base 444 being at about 120 degrees is believed to assist in causing packing ring 440 to bear against mandrel 40, and not side 433 of female packing ring 430.

Packing lubrication ring 450, preferably includes at least one rope seal such as a Garlock ½ inch (or ⁷⁄₁₆ inch or ⅜ inch) (1.27 centimeters, or 1.11 centimeters, or 0.95 centimeters) section 8913 Rope Seal. Rope seals have surprisingly been found to extend the life of other seals in the packing unit. This is thought to be by secretion of lubricants, such as graphite, during use over time. Although shown in a "Vee" type shape, rope seals typically have a square cross section and form to the shape of the area to which they are confined. Here, lubrication ring 450 is shown after being shaped by packing rings 440 and 460.

Packing ring 460 can comprise tip 462, base 464, internal surface 466, and external surface 468. Tip 462 can have an angle of about 90 degrees. Base 464 can have an angle of about 120 degrees. 90 degrees for the tip and 120 degrees for the base are conventional angles. The larger angle for the base allows thermal expansion of the tip in the base. Packing ring 460 is preferably a "Vee" packing ring—comprised of hard rubber such as that supplied by CDI material number 850 or viton such as that supplied by CDI material number 951.

Packing rings 460,470 can have substantially the same geometric construction. Packing ring 470 can comprise tip 472, base 474, internal surface 476, and external surface 478. Tip 472 can have an angle of about 90 degrees. Base 474 can have an angle of about 120 degrees. 90 degrees for the tip and 120 degrees for the base are conventional angles. The larger angle for the base allows thermal expansion of the tip in the base. Packing ring 470 is preferably a "Vee" packing ring—comprised of teflon such as that supplied by CDI material number 711.

In an alternative embodiment both packing rings 460 and 470 are "Vee" packing rings—comprised of teflon such as that supplied by CDI material number 711.

In another alternative embodiment packing ring 470 can be a "Vee" packing ring—comprised of hard rubber such as that supplied by CDI material number 850 or viton such as that supplied by CDI material number 951; and Packing ring 460 can be a "Vee" packing ring—comprised of teflon such as that supplied by CDI material number 711.

Male packing end or ring 480 can comprise tip 482, base 484, internal surface 486, and external surface 488. Tip 482 can have an angle of about 90 degrees. Packing end 480 is preferably an aluminum bronze male packing ring.

Various alternative materials for packing rings can be used such as standard chevron packing rings of standard packing materials.

The following is a list of reference numerals:

| LIST FOR REFERENCE NUMERALS | |
|---|---|
| (Part No.) Reference Numeral | (Description) Description |
| 1 | rig |
| 2 | crown block |
| 3 | cable means |
| 4 | travelling block |
| 5 | hook |
| 6 | gooseneck |
| 7 | swivel |
| 8 | drilling fluid line |
| 10 | top drive unit |
| 11 | draw works |
| 12 | cable |
| 13 | rotary table |
| 14 | well bore |
| 15 | guide rail |
| 16 | support |
| 17 | support |
| 18 | drill pipe |
| 19 | drill string |
| 20 | drill string or work string |
| 30 | swivel |
| 31 | hose |
| 40 | swivel mandrel |
| 50 | upper end |
| 60 | lower end |
| 70 | box connection |
| 80 | pin connection |
| 90 | central longitudinal passage |
| 100 | shoulder |
| 110 | interior surface |
| 120 | external surface (mandrel) |
| 130 | recessed area |

-continued

| LIST FOR REFERENCE NUMERALS | |
|---|---|
| (Part No.) Reference Numeral | (Description) Description |
| 131 | packing support area |
| 132 | packing support area |
| 140 | radial inlet ports (a plurality) |
| 145 | bearing |
| 146 | bearing |
| 150 | swivel sleeve |
| 155 | protruding section |
| 156 | shoulder |
| 157 | shoulder |
| 158 | packing support area |
| 159 | packing support area |
| 160 | upper end |
| 170 | lower end |
| 180 | central longitudinal passage |
| 190 | radial passage |
| 200 | inlet |
| 201 | arrow |
| 202 | arrow |
| 203 | arrow |
| 204 | arrow |
| 205 | arrow |
| 210 | lubrication port |
| 211 | grease injection fitting |
| 220 | packing port |
| 225 | injection fitting |
| 226 | head |
| 230 | packing port |
| 235 | injection fitting |
| 240 | cover |
| 250 | upper shoulder |
| 260 | lower shoulder |
| 270 | area for wiper ring |
| 271 | wiper ring (preferably Parker part number 959-65) |
| 280 | area for wiper ring |
| 281 | wiper ring (preferably Parker part number 959-65) |
| 290 | area for grease ring |
| 291 | grease ring (preferably Parker part number 2501000 Standard Polypak) |
| 300 | area for grease ring |
| 301 | grease ring (preferably Parker part number 2501000 Standard Polypak) |
| 305 | packing unit |
| 310 | packing retainer nut |
| 314 | bore for set screw |
| 315 | set screw for packing retainer nut |
| 316 | threaded area |
| 317 | set screw for receiving area |
| 320 | spacer |
| 322 | first end |
| 324 | second end |
| 326 | internal surface |
| 328 | external surface |
| 330 | female packing end and packing injection ring |
| 331 | concave portion |
| 332 | tip |
| 333 | side |
| 334 | recessed area |
| 335 | inner diameter |
| 336 | radial port |
| 337 | peripheral groove |
| 338 | interior groove |
| 340 | packing ring |
| 342 | tip |
| 344 | base |
| 346 | internal surface |
| 348 | external surface |
| 350 | packing ring |
| 360 | packing ring |
| 362 | tip |
| 364 | base |
| 366 | internal surface |
| 368 | external surface |

-continued

LIST FOR REFERENCE NUMERALS

| (Part No.) Reference Numeral | (Description) Description |
|---|---|
| 370 | packing ring |
| 372 | tip |
| 374 | base |
| 376 | internal surface |
| 378 | external surface |
| 380 | packing end |
| 382 | tip |
| 384 | base |
| 386 | internal surface |
| 388 | external surface |
| 405 | packing unit |
| 410 | packing retainer nut |
| 414 | bore for set screw |
| 415 | set screw for packing retainer nut |
| 416 | threaded area |
| 417 | set screw for receiving area |
| 420 | spacer and packing injection ring |
| 421 | first end |
| 422 | second end |
| 423 | internal surface |
| 424 | external surface |
| 437 | radial port |
| 438 | peripheral groove |
| 439 | interior groove |
| 430 | female packing end |
| 431 | concave portion |
| 432 | tip |
| 433 | side |
| 434 | recessed area |
| 435 | inner diameter |
| 436 | external diameter |
| 440 | packing ring |
| 442 | tip |
| 444 | base |
| 446 | internal surface |
| 448 | external surface |
| 450 | packing ring |
| 460 | packing ring |
| 462 | tip |
| 464 | base |
| 466 | internal surface |
| 468 | external surface |
| 470 | packing ring |
| 472 | tip |
| 474 | base |
| 476 | internal surface |
| 478 | external surface |
| 480 | packing end |
| 482 | tip |
| 484 | base |
| 486 | internal surface |
| 488 | external surface |
| 600 | clamp |
| 605 | groove |
| 610 | first portion |
| 620 | second portion |
| 625 | third portion |
| 630 | torque arm |
| 650 | shackle |
| 660 | shackle |
| 670 | plurality of fasteners |
| 680 | plurality of fasteners |
| 690 | keyway |
| 691 | keyway |
| 700 | key |
| 710 | keyway |
| 711 | keyway |
| 720 | key |

All measurements disclosed herein are at standard temperature and pressure, at sea level on Earth, unless indicated otherwise. All materials used or intended to be used in a human being are biocompatible, unless indicated otherwise.

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

The invention claimed is:

1. A top drive swivel insertable into a drill or work string comprising:
   (a) a mandrel having upper and lower end sections and connected to and rotatable with upper and lower drill or work string sections, the mandrel including a longitudinal passage forming a continuation of a passage in the drill or work string sections;
   (b) a sleeve having a longitudinal sleeve passage, the sleeve being rotatably connected to the mandrel by a pair of longitudinally spaced bearings;
   (c) a pair of spaced apart packing units between upper and lower end portions of the mandrel and sleeve, the packing units preventing leakage of fluid between the mandrel and sleeve;
   (d) the sleeve comprising an inlet port positioned between the spaced bearings;
   (e) the mandrel comprising a plurality of spaced apart radial ports in fluid communication with both the inlet port and the longitudinal passage to supply pressurized fluid from the inlet port to the longitudinal passage and in the passage in drill or work string sections; and
   (f) wherein each of the packing units comprise a plurality of packing rings, at least one packing ring in each packing unit being comprised of a non-rope seal and being spaced close to a rope seal.

2. The top drive swivel of claim 1, wherein each packing unit comprises five packing rings, one being comprised of bronze filled teflon, another being a rope seal, another being comprised of teflon, and another being comprised of teflon.

3. The top drive swivel of claim 2, wherein the order of packing rings are as specified.

4. The top drive swivel of claim 1, wherein each packing unit comprises five packing rings, one being comprised of bronze filled teflon, another being a rope seal, another being comprised of hard rubber, and another being comprised of teflon.

5. The top drive swivel of claim 4, wherein the order of packing rings are as specified.

6. The top drive swivel of claim 1, wherein each packing unit comprises five packing rings, one being comprised of bronze filled teflon, another being a rope seal, another being comprised of viton, and another being comprised of teflon.

7. The top drive swivel of claim 6, wherein the order of packing rings are as specified.

8. The top drive swivel of claim 1, wherein each packing unit further comprises a first female packing end, the first female packing end being comprised of a bearing grade peak material.

9. The top drive swivel of claim 1, wherein each packing unit further comprises a first female packing end, the first female packing end including a concave portion, the concave portion having about an angle of 130 degrees.

10. The top drive swivel of claim 1, wherein each packing unit further comprises a first female packing end, the first female packing end including a tip and inner and outer diameter portions, at least a portion of the inner diameter portion being recessed from the tip.

11. The top drive swivel of claim 1, wherein no rings of similar composition are placed adjacent each other.

12. The top drive swivel of claim 1, wherein each packing unit further comprises a packing injection ring.

13. The top drive swivel of claim 12, wherein each packing unit includes a female packing end, and the packing injection ring is connected to the female packing end.

14. The top drive swivel of claim 1, wherein the rings and ends of each packing unit are arranged as follows: female packing end comprised of bronze, ring comprised of a bronze filled teflon, lubricity ring, ring comprised of viton, ring comprised of teflon, and male packing end ring.

15. The top drive swivel of claim 1, wherein the rings and ends of each packing unit are arranged as follows: female packing end comprised of bronze, ring comprised of a bronze filled teflon, lubricity ring, ring comprised of hard rubber, ring comprised of teflon, and male packing end ring.

16. The top drive swivel of claim 1, wherein the rings and ends of each packing unit are arranged as follows: female packing end comprised of bronze, ring comprised of a bronze filled teflon, lubricity ring, ring comprised of teflon, ring comprised of teflon, and male packing end ring.

17. A top drive swivel insertable into a drill or work string comprising:
(a) a mandrel having upper and lower end sections and connected to and rotatable with upper and lower drill or work string sections, the mandrel including a longitudinal passage forming a continuation of a passage in the drill or work string sections;
(b) a sleeve having a longitudinal sleeve passage, the sleeve being rotatably connected to the mandrel by a pair of longitudinally spaced bearings;
(c) a pair of spaced apart packing units between upper and lower end portions of the mandrel and sleeve, the packing units preventing leakage of fluid between the mandrel and sleeve;
(d) the sleeve comprising an inlet port positioned between the spaced bearings;
(e) the mandrel comprising a plurality of radial ports in fluid communication with both the inlet port; and
(f) wherein each of the packing units comprise a plurality of packing rings, at least one packing ring in each packing unit being comprised of a sealing packing ring being spaced close to a lubricating rope seal.

* * * * *